(12) United States Patent
Cioffi et al.

(10) Patent No.: US 7,558,315 B2
(45) Date of Patent: Jul. 7, 2009

(54) ADAPTIVE MARGIN AND BAND CONTROL IN DIGITAL SUBSCRIBER LINE (DSL) SYSTEMS

(75) Inventors: John M. Cioffi, Atherton, CA (US); Wonjong Rhee, Palo Alto, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 914 days.

(21) Appl. No.: 10/893,826

(22) Filed: Jul. 19, 2004

(65) Prior Publication Data

US 2005/0123028 A1   Jun. 9, 2005

Related U.S. Application Data

(60) Provisional application No. 60/527,853, filed on Dec. 7, 2003.

(51) Int. Cl.
*H04B 1/38* (2006.01)
(52) U.S. Cl. ...................................... 375/222
(58) Field of Classification Search .................. 375/222
See application file for complete search history.

(56) References Cited

U.S. PATENT DOCUMENTS 5,479,447 A   12/1995 Chow et al.

(Continued)

FOREIGN PATENT DOCUMENTS

CN   1210399   3/1999

(Continued)

OTHER PUBLICATIONS

Seong Taek Chung, "Rate and power control in a two-user multicarrier channel with no coordination: the optimal scheme vs. suboptimal methods", Vehicular Technology Conference, 2002, Proceedings, VTC 2002-Fall. 2002 IEEE 56th vol. 3, Sep. 24-28, 2002 pp. 1744-1748 vol. 3.*

(Continued)

*Primary Examiner*—Juan A Torres
(74) *Attorney, Agent, or Firm*—Blakely, Sokoloff, Taylor & Zafman

(57) ABSTRACT

Controlling margins in a DSL modem pair is based on collected operational data. The operational data is analyzed and at least one of the modems in the modem pair is instructed to use a margin-related parameter value to assist the modem pair in meeting a margin target, such as a margin limit imposed by a DSL standard or the like. A controller, such as a DSM Center, a "smart" modem unit and/or a computer system can collect and analyze the operational data and generate one or more margin-related parameter values. The margin-related parameter value may be a PSD-related value, such as the MAXNOMPSD, MAXNOMATP or PSDMASK parameter used by various ADSL systems, and may be a shaped spectral mask and/or caps or limits on bit loading for use in transmissions between the modems. In some cases, preference bands can be imposed to direct modems to favor and/or avoid certain frequencies in the modem's usable band(s). The operational data may include historical data relating to prior performance of the modem pair and prior margin compliance. A distribution of margins also may be based on operational data and may be estimated as a function of data rate. Using the estimated margin distribution, a distribution of performance parameters also is calculated, including the probabilities of line outages and probabilities of one or more error parameters exceeding minimum levels. Data rates and/or performance-related parameters may be set on the basis of the estimated performance of the system using various margin settings and levels.

25 Claims, 13 Drawing Sheets

U.S. PATENT DOCUMENTS

| | | | |
|---|---|---|---|
| 5,832,387 A | | 11/1998 | Bae et al. |
| 6,058,162 A | * | 5/2000 | Nelson et al. ............. 379/22.04 |
| 6,061,427 A | * | 5/2000 | Ryoo ...................... 379/22.04 |
| 6,075,821 A | | 6/2000 | Kao et al. |
| 6,111,936 A | * | 8/2000 | Bremer ......................... 379/28 |
| 6,236,714 B1 | * | 5/2001 | Zheng et al. ................ 379/1.03 |
| 6,292,559 B1 | | 9/2001 | Gaikwad et al. |
| 6,356,585 B1 | * | 3/2002 | Ko et al. ...................... 375/222 |
| 6,532,277 B2 | | 3/2003 | Ulanskas et al. |
| 6,549,520 B1 | * | 4/2003 | Gross et al. .................. 370/242 |
| 6,580,727 B1 | | 6/2003 | Yim et al. |
| 6,636,603 B1 | | 10/2003 | Milbrandt |
| 6,647,058 B1 | | 11/2003 | Bremer et al. |
| 6,711,207 B1 | | 3/2004 | Amrany et al. |
| 6,744,811 B1 | | 6/2004 | Kantschuk |
| 6,785,371 B1 | * | 8/2004 | Olafsson .................. 379/93.35 |
| 7,035,249 B2 | | 4/2006 | Christensen et al. |
| 7,106,833 B2 | | 9/2006 | Kerpez |
| 2002/0009155 A1 | * | 1/2002 | Tzannes ...................... 375/260 |
| 2002/0118652 A1 | | 8/2002 | Ahmed et al. |
| 2002/0136397 A1 | | 9/2002 | Zeng et al. |
| 2003/0031239 A1 | | 2/2003 | Posthuma |
| 2003/0086514 A1 | | 5/2003 | Ginis et al. |
| 2003/0123560 A1 | | 7/2003 | Jacobsen et al. |
| 2004/0034875 A1 | | 2/2004 | Bulkowski et al. |
| 2004/0120390 A1 | | 6/2004 | Brown et al. |
| 2004/0161048 A1 | | 8/2004 | Zaleski et al. |
| 2005/0123027 A1 | | 6/2005 | Coffi et al. |
| 2005/0123028 A1 | | 6/2005 | Cioffi et al. |
| 2005/0190826 A1 | | 9/2005 | Van Bruyssel et al. |
| 2005/0213714 A1 | | 9/2005 | Langberg et al. |
| 2005/0220178 A1 | | 10/2005 | Ginis |
| 2005/0220179 A1 | | 10/2005 | Tsatsanis |
| 2005/0237940 A1 | | 10/2005 | Tennyson |
| 2005/0259725 A1 | * | 11/2005 | Cioffi .......................... 375/222 |
| 2006/0072722 A1 | | 4/2006 | Savoor et al. |
| 2006/0159026 A1 | | 7/2006 | Wu et al. |
| 2006/0159106 A1 | | 7/2006 | Van Slyke et al. |
| 2006/0164101 A1 | | 7/2006 | Fossion et al. |
| 2007/0280334 A1 | | 12/2007 | Lv et al. |

FOREIGN PATENT DOCUMENTS

| | | |
|---|---|---|
| DE | 10001150 | 7/2001 |
| EP | 1 009 135 A2 | 6/2000 |
| EP | 1 213 848 A1 | 6/2002 |
| EP | 1 283 655 A | 2/2003 |
| EP | 1699172 | 9/2006 |
| EP | 1804450 | 7/2007 |
| WO | WO-01/35611 | 5/2001 |
| WO | WO0135614 | 5/2001 |
| WO | WO-03013109 | 2/2003 |
| WO | WO 2005/036919 A2 | 4/2005 |
| WO | WO-2007/033579 | 3/2007 |
| WO | WO-2007044326 | 4/2007 |

OTHER PUBLICATIONS

J. Cioffi, "Unbundled DSL Evolution," ANSI Contribution T1E1.4/2001-088, Feb. 19, 2001 (6 pgs).

J. Cioffi et al., "Examples Improvements of Dynamic Spectrum Management," ANSI Contribution T1E1.4/2001-088, Feb. 19, 2001 (14 pgs).

J. Cioffi, "Proposal for Study of Dynamic Spectrum Management for the Evolving Unbundling Architecture of DSL," ANSI Contribution T1E1.4/2001-090, Feb. 19, 2001 (3 pgs).

J. Cioffi et al., "Indication of Capability to Release of Channel Information," ANSI Contribution T1E1.4/2001-146RI, May 7, 2001 (3 pgs).

J. Cioffi et al., "Indication of Capability to Release of Channel Information," ANSI Contribution T1E1.4/2001-146R2, Nov. 5, 2001 (3 pgs).

J. Cioffi et al., "Channel Identification with Dynamic Spectrum Management," ANSI Contribution T1E1.4/2001-147, May 7, 2001 (8 pgs).

J. Cioffi et al., "Channel Identification with Dynamic Spectrum Management," ANSI Contribution T1E1.4/2001-147R1, Nov. 5, 2001 (9 pgs).

J. Cioffi et al., "Proposed Scope and Mission for DSM(188)," ANSI Contribution T1E1.4/2001-188R2, Aug. 20, 2001 (4 pgs).

J. Cioffi et al., "Proposed Scope and Mission for DSM(188)," ANSI Contribution T1E1.4/2001-188R4, Nov. 5, 2001 (4 pgs).

J. Cioffi et al., "Iterative Waterfilling for Dynamic Spectrum Management," ANSI Contribution T1E1.4/2001-200R3, Aug. 20, 2001 (1 pg).

J. Cioffi et al., "Iterative Waterfilling for Dynamic Spectrum Management," ANSI Contribution T1E1.4/2001-200R5, Nov. 5, 2001 (14 pgs).

J. Cioffi et al., "Indication of Capability to Release of Channel Information," ANSI Contribution T1E1.4/2002-041, May 7, 2001 (3 pgs).

J. Cioffi (Editor), "Draft Sections 1 and 4 proposed, Dynamic Spectrum Management," ANSI Contribution T1E1.4/2002-040R1, Apr. 8, 2002 (4 pgs).

J. Cioffi et al., "Indication of Capability to Release of Channel Information," ANSI Contribution T1E1.4/2002-041R1, Apr. 8, 2002 (3 pgs).

J. Cioffi et al., "Indication of Capability to Release of Channel Information," ANSI Contribution T1E1.4/2002-041R3, Aug. 19, 2002 (4 pgs).

J. Cioffi et al., "Indication of Capability to Release of Channel Information," ANSI Contribution T1E1.4/2002-041R4, Nov. 18, 2002 (3 pgs).

J. Cioffi et al., "Autonomous Level 0 DSM Results: iterative-waterfilling for ADSL and VDSL," ANSI Contribution T1E1.4/2002-057, Feb. 18, 2002 (10 pgs).

J. Cioffi et al., "Autonomous DSM Mixture of Symmetric and Asymmetric Service: Bi-directional Iterative Waterfilling (at Level 0 or at Level 1).," ANSI Contribution T1E1.4/2002-058R1, Feb. 18, 2002 (9 pgs).

J. Cioffi et al., "Coordinated Level 2 DSM Results: Vectoring of multiple DSLs," ANSI Contribution T1E1.4/2002-059, Feb. 18, 2002 (8 pgs).

K. Kerpez et al., "Response to 2001-273R1 using Telcordia DSL Analysis," ANSI Contribution T1E1.4/2002-063R1, Feb. 18, 2002 (3 pgs).

J. Cioffi et al., "Response to 2001-273R1 using measured Verizon DSL SNRs," ANSI Contribution T1E1.4/2002-069, Feb. 18, 2002 (15 pgs).

J. Cioffi et al., "'New Technology' in Spectrum Management," ANSI Contribution T1E1.4/2002-128, Apr. 8, 2002 (2 pgs).

J. Cioffi et al., "10MDSL Beyond All Goals, and Spectrally Compatible with ADSL and VDSL, from CO or RTs," ANSI Contribution T1E1.4/2002-129, Apr. 8, 2002 (10 pgs).

J. Cioffi et al., "Some proposed Section 7.1 text for ADSL fixed-margin mode," ANSI Contribution T1E1.4/2002-176, Aug. 19, 2002 (3 pgs).

J. Cioffi et al., "Some proposed Section 7.1 text for ADSL fixed-margin mode," ANSI Contribution T1E1.4/2002-176R1, Nov. 18, 2002 (13 pgs).

J. Cioffi et al., "Proposed 'Stretch Goals' for 10MDSL," ANSI Contribution T1E1.4/2002-181, Aug. 19, 2002 (6 pgs).

J. Cioffi et al., "Proposed 'Stretch Goals' for 10MDSL," ANSI Contribution T1E1.4/2002-181R1, Aug. 19, 2002 (7 pgs).

K. Kerpez, "Jointly Optimizing DSL Spectra," ANSI Contribution T1E1.4/2002-231, Nov. 18, 2002 (12 pgs).

A. Leshem, "Dynamic FDM and Dynamic DS Power Back-Off: A Simplified DSM Algorithm for Coexistence between RT and CO based deployments," ANSI Contribution T1E1.4/2002-284, Nov. 17, 2002 (9 pgs).

Yu et al., "Iterative Water-filling for Vector Multiple Access Channels," IEEE International Symposium on Information Theory, (ISIT), 2001 (1 pg).

Yu et al., "Competitive Equilibrium in the Gaussian Interference Channel," IEEE International Symposium on Information Theory (ISIT), Jun. 2000 (1 pg).

Yu et al., "Distributed Multiuser Power Control for Digital Subscriber Lines," IEEE Journal on Selected Areas in Communications, vol. 20, No. 5, pp. 1105-1115; Jun. 2002 (11 pgs).

W. Rhee, "Multiuser Wireless Communications with Multiple Antennas," Dissertation Submitted to the Department of Electrical Engineering and the Committee on Graduate Studies of Stanford University, Jun. 2002 (129 pgs).

W. Yu, "Competition and Cooperation in Multi-user Communication Environments," Dissertation Submitted to the Department of Electrical Engineering and the Committee on Graduate Studies of Stanford University, Jun. 2002 (120 pgs).

International Search Report, International Application No. PCT/IB2004/003960 (9 pgs).

Written Opinion of the International Searching Authority, International Application No. PCT/IB2004/003960 (7 pgs).

ITU-T: "G.992.1: Asymmetric digital subscriber line (ADSL) transceivers" ITU-T Recommendation G.992.1; Jun. 1999, pp. 226-239 XP-002321806. (14 pages).

Patent Cooperation Treaty, "International Search Report and Written Opinion", International Application No. US2006/026796, (Apr. 10, 2007), 7 pgs.

International Search Report from International Application No. PCT/IB2006/000824, 4 pgs.

Written Opinion of the International Searching Authority, International Application No. PCT/IB2006/000824, 7 pgs.

Chan, Vincent M., et al., "Multiuser Spectrum Optimization for Discrete Multitone Systems with Asynchronous Crosstalk", IEEE Transactions on Signal Processing, vol. 55, No. 11, Nov. 2007. University of Toronto, 11 pgs.

European Patent Office, "First Examination Report for EP Application No. 4801293.4", (Dec. 13, 2007), 5 pgs.

Kerpez, et al., "Advanced DSL Management", IEEE Communications Magazine; vol. 41, No. 11, XP-001177649, (Sep. 9, 2003), 116-123.

Kerpez, et al., IEEE Communications Magazine; vol. 40, No. 11., XP-001141239, (Nov. 11, 2002), 116-123.

Le Nir, Vincent, et al., "Optimal Power Allocation under Per-Modem Total Power and Spectral Mask Constraints in xDSL Vector Channels with Alien Crosstalk", ICASSP 2007, (Apr. 15, 2007), 4 pgs.

Liu, Yu-Sun, et al., "Distributed Dynamic Spectrum Management for Digital Subscriber Line", Institute of Electronics, Information and Communication Engineers (IEICE), vol. E90-B, No. 3, Mar. 2007, 491-498.

Song, et al., "Dynamic Spectrum Management for Next-Generation DSL Systems", IEEE Communications Magazine, XP-002395021, (Oct. 2002), 101-109.

State IP Office of P.R. China, "Notification of the First Office Action", Chinese Application No. 200480041317.4, (Mar. 7, 2008), 21 pgs.

Yu, Wei, et al., "Dual Methods for Nonconvex Spectrum Optimization for Multicarrier Systems", IEEE Transactions on Communications, vol. 54, No. 7, Jul. 2006, 1310-22.

Cendrillon et al., "Optimal Multi-user Spectrum Management for Digital Subscriber Lines," 2004 IEEE International Conference on Communications; vol. 1; Jun. 20-24, 2004; ISBN: 0-7803-8533-0 (5 pgs).

Yu, Wei, et al., "On Constant Power Water-filling," IEEE, 0-7803-7097-1/01, (2001), pp. 1665-1669.

International Search Report and Written Opinion from PCT/US06/38605 mailed Nov. 17, 2008, 18 pgs.

* cited by examiner

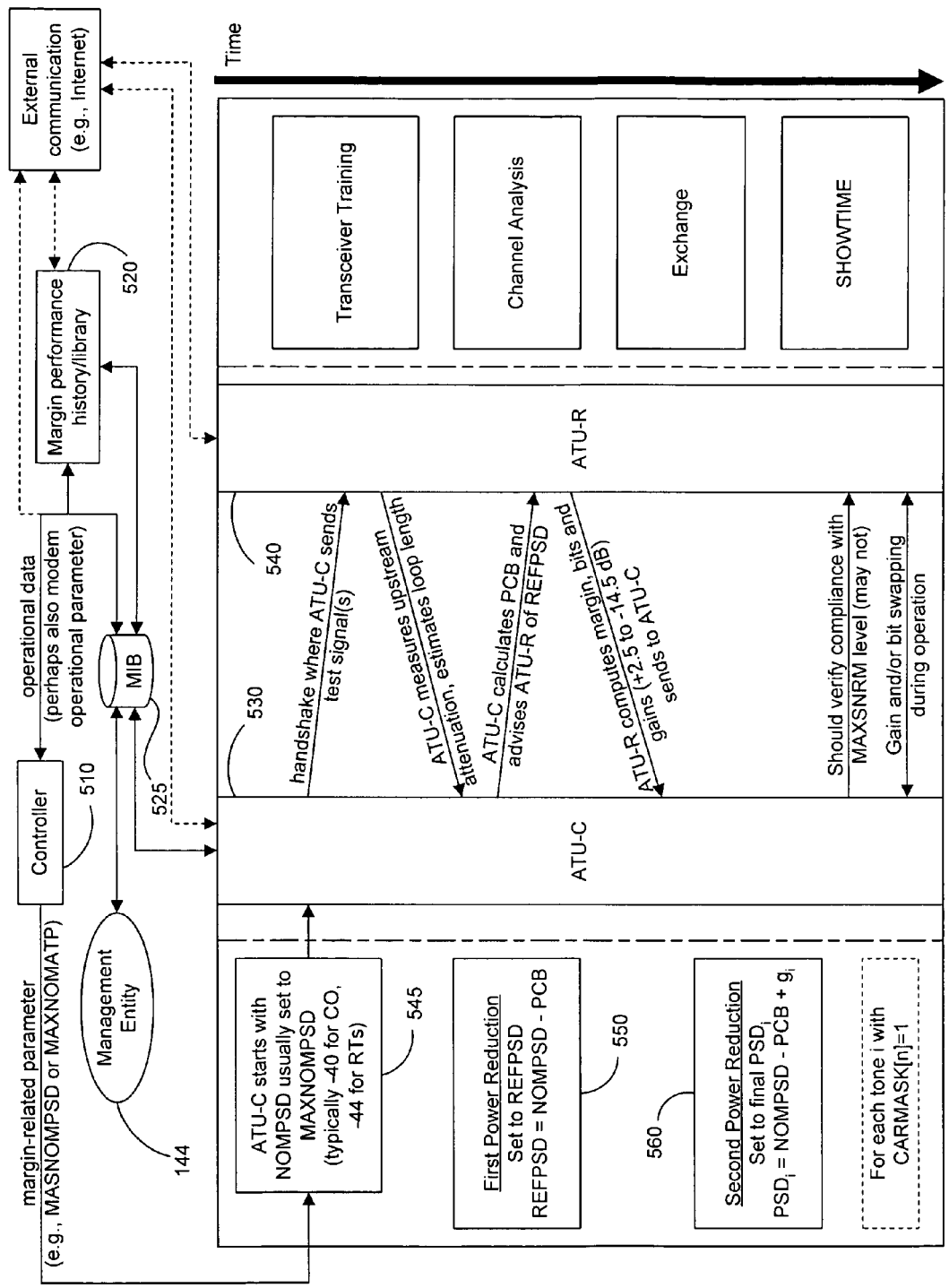
Figure 5A - ADSL1 downstream flow

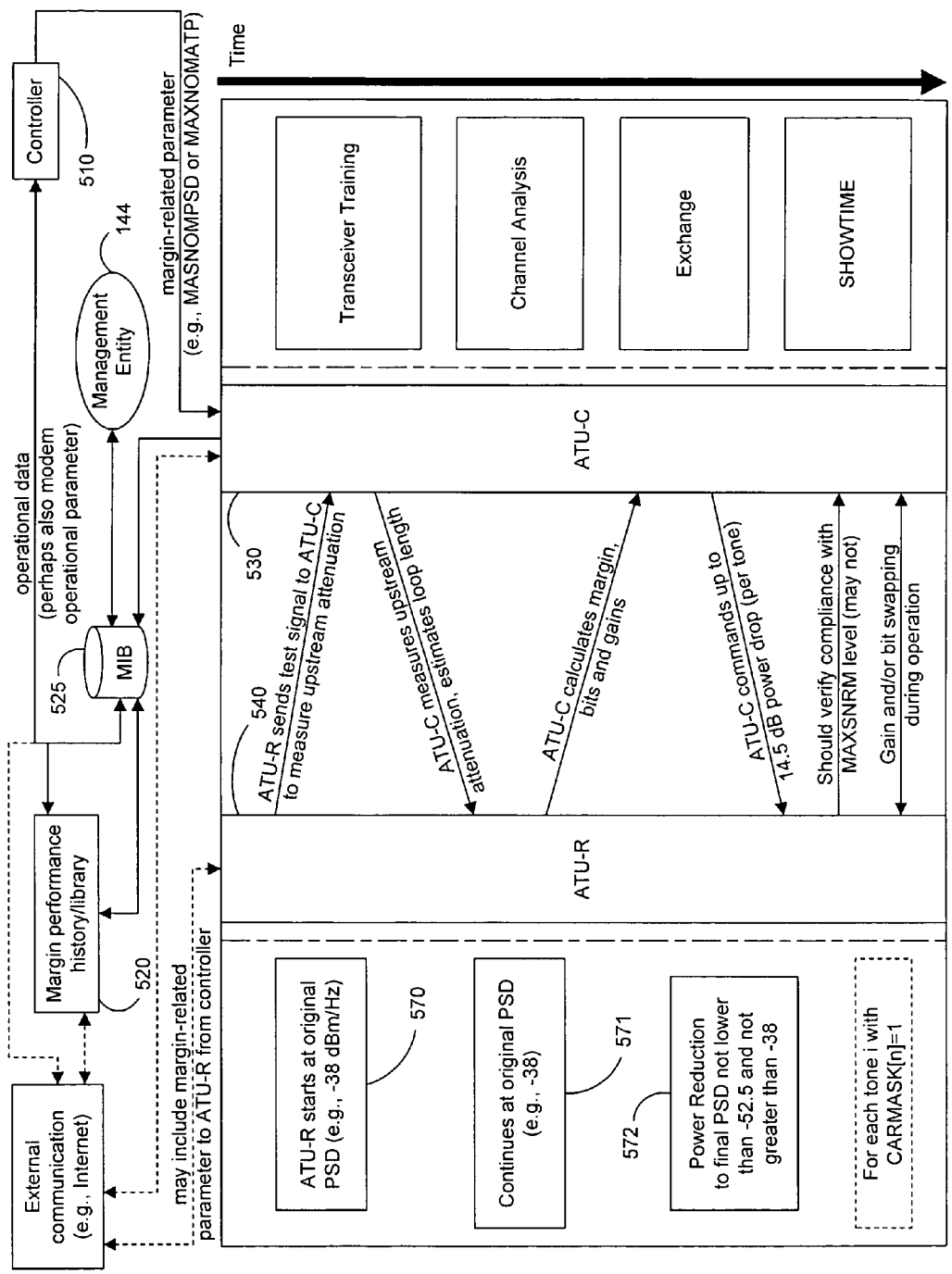
Figure 5B - ADSL1 upstream flow

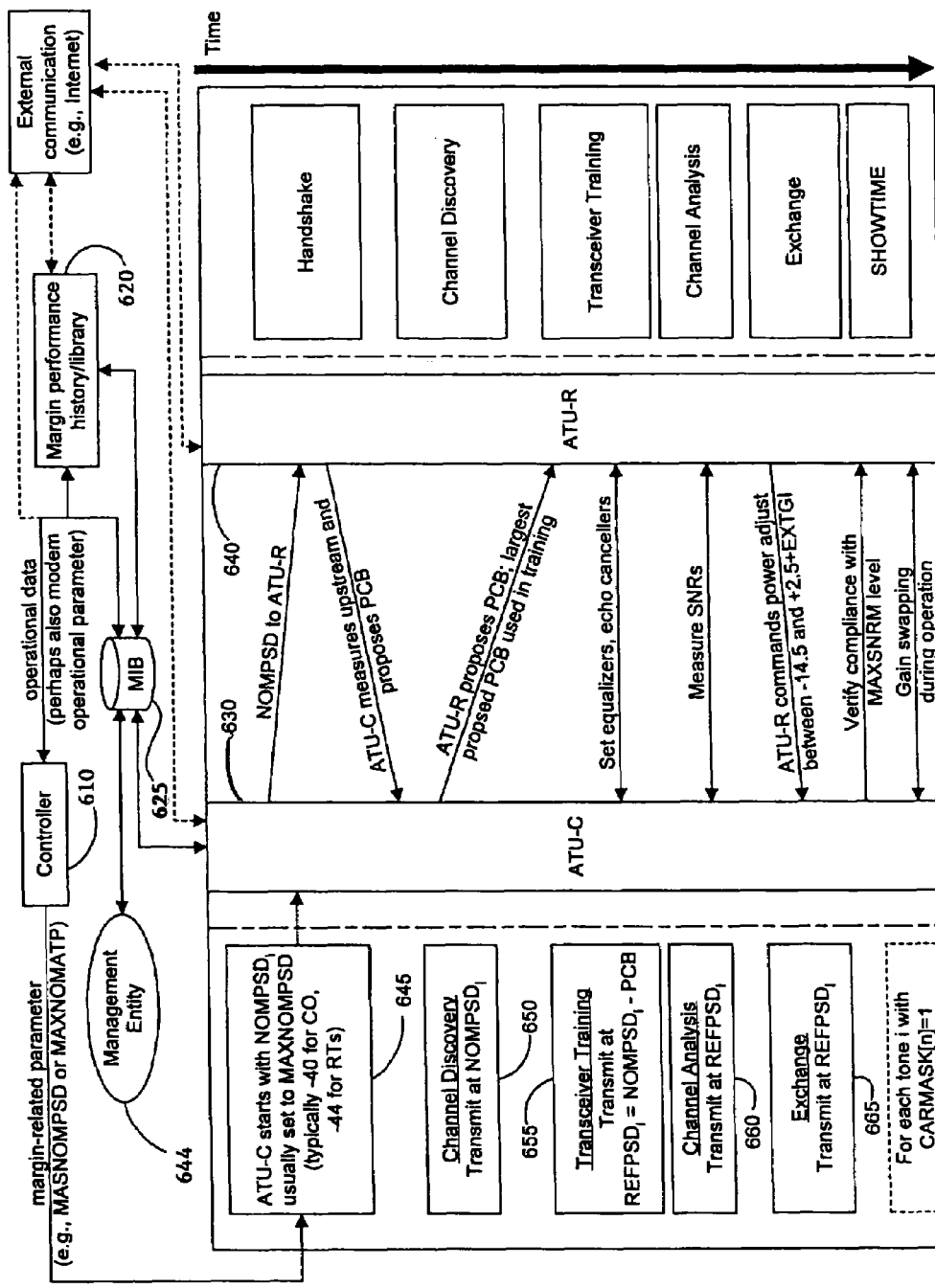
Figure 6A - ADSL2 DOWNSTREAM FLOW

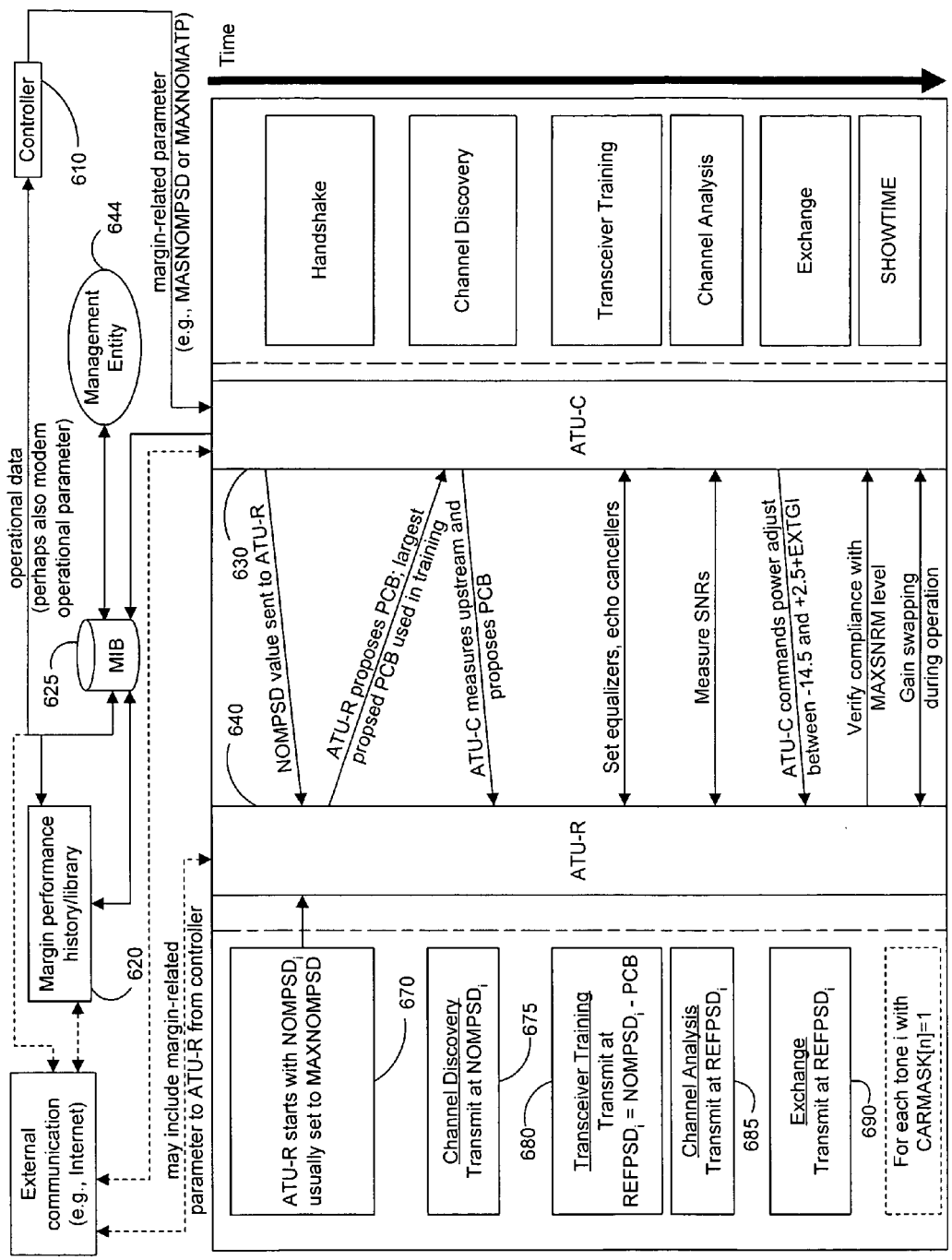
Figure 6B - ADSL2 upstream flow

Table 1 – Normalized $(v_n = 1)$ incremental energies for no trellis coding

| Number of loaded bits $b$ | Normalized incremental energy $\Delta(b)$ | Normalized total energy $\Delta_{total} = \sum_{i=1}^{b}\Delta(i)$ |
|---|---|---|
| 1 | (½)ϵ | (½)ϵ |
| 2 | (½)ϵ | ϵ |
| 3 | 2ϵ | 3ϵ |
| 4 | 2ϵ | 5ϵ |
| 5 | 5ϵ | 10ϵ |
| 6 | 11ϵ | 21ϵ |
| 7 | 20ϵ | 41ϵ |
| 8 | 44ϵ | 85ϵ |
| 9 | 80ϵ | 165ϵ |
| 10 | 176ϵ | 341ϵ |
| 11 | 320ϵ | 661ϵ |
| 12 | 704ϵ | 1365ϵ |
| 13 | 1280ϵ | 2645ϵ |
| 14 | 2816ϵ | 5461ϵ |
| 15 | 5120ϵ | 10,581ϵ |

Table 2 – 4D Trellis Code loading energies (normalized).

| $b$ | $\Delta(b)$ for $v_n$ | $\Delta_{total}$ for $v_n$ | $\Delta(b)$ for $v_{n+1}$ | $\Delta_{total}$ for $v_{n+1}$ |
|---|---|---|---|---|
| 1 | ϵ | ϵ | (½)ϵ | (½)ϵ |
| 2 | 2ϵ | 3ϵ | (½)ϵ | ϵ |
| 3 | 2ϵ | 5ϵ | 2ϵ | 3ϵ |
| 4 | 5ϵ | 10ϵ | 2ϵ | 5ϵ |
| 5 | 11ϵ | 21ϵ | 5ϵ | 10ϵ |
| 6 | 20ϵ | 41ϵ | 11ϵ | 21ϵ |
| 7 | 44ϵ | 85ϵ | 20ϵ | 41ϵ |
| 8 | 80ϵ | 165ϵ | 44ϵ | 85ϵ |
| 9 | 176ϵ | 341ϵ | 80ϵ | 165ϵ |
| 10 | 320ϵ | 661ϵ | 176ϵ | 341ϵ |
| 11 | 704ϵ | 1365ϵ | 320ϵ | 661ϵ |
| 12 | 1280ϵ | 2645ϵ | 704ϵ | 1365ϵ |
| 13 | 2816ϵ | 5461ϵ | 1280ϵ | 2645ϵ |
| 14 | 5120ϵ | 10,581ϵ | 2816ϵ | 5461ϵ |
| 15 | ------ | ------ | 5120ϵ | 10,581ϵ |

*Figure 9*

ADAPTIVE MARGIN AND BAND CONTROL IN DIGITAL SUBSCRIBER LINE (DSL) SYSTEMS

CROSS-REFERENCE TO RELATED APPLICATIONS

This application claims the benefit of priority under 35 U.S.C. § 119(e) of U.S. Provisional No. 60/527,853 filed on Dec. 7, 2003, entitled DYNAMIC MANAGEMENT OF COMMUNICATION SYSTEM, the disclosure of which is incorporated herein by reference in its entirety for all purposes

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communication systems. More specifically, this invention relates to adaptive control of various transmission parameters, including but not limited to maximum transmit power spectral density, maximum aggregate transmission power, transmission band preference, minimum and maximum receiver margin, frequency-dependent bit-loading and power controls and/or bit-loading restrictions in communication systems such as DSL systems.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line. The adaptive assignment can be continued during live data transmission on channels or lines that vary with time using a process often referred to as "bit-swapping" that uses a secure relatively low-speed reverse channel to inform the transmitter of assignment changes.

Impulse noise, other noise and other sources of error can substantially impact the accuracy of data transmitted by ADSL and other communications systems. Various techniques have been developed for reducing, avoiding and/or repairing the damage done to data by such error during transmission. These error reduction/avoidance/repair techniques have performance costs for a communication system in which they are used. As is well known in the art, inadequate power transmission levels lead to errors because the transmission power is not high enough to overcome noise and other interference in a given channel. These errors lead to lost data and/or the need for re-transmission of data, sometimes multiple times. To prevent such errors, systems utilize extra transmission power that results in margins above a known or calculated signal-to-noise ratio (SNR) that assures compliance with an acceptable error rate.

Generally, DSL modem pairs determine power, margin and other operational characteristics of the pair during initialization, training, channel analysis and exchange phases before full operation (sometimes referred to as SHOWTIME). The process starts with a base power spectral density (PSD) value or mask. This may be a "flat" or constant value (that is, frequency independent) or may be a variable mask where the PSD value is frequency-specific or frequency-dependent. There is an initial PSD value in various DSLs (sometimes referred to as "NOMPSD") and typically an upper limit for NOMPSD is defined by an applicable standard for a given country. Using this initial PSD value, the modems estimate line attenuation and line length (and perhaps other parameters and/or values).

Using the line attenuation and length estimates, one or both modems can define a power drop, or power cut-back (PCB) value, that reduces the initial PSD value. As noted below, different DSL standards set and adjust power (PSD and PCB, for example) according to different rules, if the standards are indeed observed and obeyed at all.

Using the once-adjusted PSD value (sometimes referred to as REFPSD=PSD−PCB), the modems compute the bit-loading ($b_i$), gains ($g_i$) and margin during the channel analysis phase. The gains $g_i$ are adjustments to individual bit-loaded tones' transmit power levels in the DMT scheme, providing a relatively uniform margin for transmission of data on the line. The gains can be adjusted during SHOWTIME to reflect changing line conditions, etc., but may be very limited as to the amount of adjustment and the way such gains adjustments can be performed.

Depending on the equipment manufacturer and the DSL standard being used, compliance with each standard's rules and guidelines and/or other appropriate operational limits varies from strict compliance by some parties (usually leading to very conservative or timid setting of DSL service rates in operation) to grave disregard for even basic operational guidelines and rules. In many cases, whether through intentional or inadvertent non-compliance, excessive power and/or margins are used in an attempt to avoid problems that can arise from too little of either or both.

Excessively high power transmission levels, however, lead to other problems. For example, one or more lines' use of excessive transmission power can generate strong crosstalk problems and interference in nearby lines. Crosstalk is unwanted interference and/or signal noise electromagnetically passed between lines that share the same or adjacent binders. In addition, use of transmission power above necessary levels also means that the communication system is operated more expensively, to the detriment of all users. Following is a brief summary of existing standards and practices for several modes of DSL service to which embodiments of the invention disclosed below may apply, including nuances that differentiate each particular standard from the more generic initialization, training, channel analysis and exchange procedure discussed above.

ADSL1-G.992.1 Standard (Also Referred to Herein as the "ADSL1 Standard" or "ADSL1"):

(1) Has a MAXSNRM maximum margin (or equivalent) limit setting that can be specified by operators, but the capability to observe and implement this limit varies with modem manufacturers and interpretations of the standard, with the result that it is often effectively ignored. Generally, an "operator" is a telecom or other service provider who operates the network and provides the service itself. Internet service providers are not generally considered operators because they usually subcontract the service to another party.

(2) ATU-R (downstream receiver) and ATU-C (upstream receiver) are limited to 14.5 dB maximum gain reduction request, which often is insufficient to implement the intent of MAXSNRM. Furthermore some ATU-R modems ignore MAXSNRM and there has never been an interoperability test to declare such modems non-compliant with G.992.1 that actually verifies the margin does not exceed MAXSNRM.

(3) Downstream ATU-C transmitters reduce power by up to 12 dB according to algorithms in the annexes of G.992.1 (the most popular of which are Annexes A, B, and C) if the early-training received upstream signals are large, indicating that the loop is short. The algorithms of Annexes A, B, and C are blind to downstream channel-output noise, and so are very "timid" in reducing power and almost always do not reduce power nearly enough—for instance, the widely used Annex A algorithm only applies to lines less than 3000 feet in length and thus fails to accommodate many situations in which longer lines might need power reduction as well.

(4) An initial, flat PSD upper bound or "mask" can be programmed according to a MAXNOMPSD parameter, which is between −40 and −52 dBm/Hz in 2 dB steps. The MAXNOMPSD value is set by the operator and is the maximum value that NOMPSD can assume at the initiation of transceiver training. The modem manufacturer can set a modem to use a lower NOMPSD value, in which case NOMPSD<MAXNOMPSD. The MIB/telcom operator can only set MAXNOMPSD in earlier systems, but cannot force the NOMPSD value itself. In ADSL1, NOMPSD is communicated during training to the receiver (for subsequent attenuation calculation) by the transmitter. Again, there is no MIB parameter that directly specifies NOMPSD in ADSL1. Usually, MAXNOMPSD is the NOMPSD that is used in the very first transceiver training phase of ADSL1, but the NOMPSD level (only restricted to be less than or equal to MAXNOMPSD) is decided by the modem manufacturer in design and not the operator. Thus, by setting MAXNOMPSD the operator is assured that NOMPSD will be reduced to an upper limit level of NOMPSD−$2n_{PCB}$ dBm/Hz, as defined, with $n_{PCB}$=0 to 6 (that is, if NOMPSD is −40, then PSD power can be dropped by 0, 2, 4, 6, 8, 10 or 12 dB).

(5) Some manufacturers' ATU-R receivers ignore the MAXSNRM altogether and never request the 14.5 dB power reduction despite such power reduction being mandated by the operator and by standards.

(6) Gain swapping during live operation may be limited and recommended but not required in Annex A) to allow only +/−2.5 dB gain adjustments after training in SHOWTIME. Thus, gain swapping is limited in some modems to a total of +/−2.5 dB in ADSL1. If gain is not reduced enough in training for any reason (for example, a spurious noise was present), then further lowering will not occur unless the modem retrains. A record of retrains (a retrain count) may be maintained by the DSL system as an indication of how many retrains are performed in a given period of time and as an indication that the MAXSNRM level might be set too low if the retrain count is high. Gain-swaps are applied successively in ADSL1 (so that they build upon one another), but the total gain reduction of any SHOWTIME succession of gain swaps is often limited to a maximum of +/−2.5 dB with respect to training. Some vendors, however, do request a succession of gain reductions that lead to the full ADSL 1-allowed gain reduction of −14.5 dB during SHOWTIME. When asking for lower than −2.5 dB changes, the receivers in such full-range gain-swap systems need to be smart enough to adjust internal signal processing to prevent intersymbol interference from the fixed synch symbol (that is never reduced in power during SHOWTIME by gain swaps, unlike the other 68 live-data symbols). Some deficient receivers ask for the power reduction, but then fail to adjust themselves internally when a lower than −2.5 dB gain reduction is implemented (and operators do not easily know on which lines these deficient receivers are located). Such a deficient ATU-R then drops the DSL connection because it assumes the line went bad, when, instead, the problem is due to the ATU-R's faulty implementation of asking for a gain reduction it cannot handle. Due to this problem, service providers may force DSLAM providers to always ignore power reduction requests that exceed the +/−2.5 dB range during live operation (and do so network wide because they do not know where the deficient receivers are located, thus limiting also all good receivers). This further limits power reduction if the service provider selects this option to not have to change the deficient receivers already deployed in their network.

ADSL2-G.992.3 Standard (Also Referred to Herein as the "ADSL2 Standard" or "ADSL2"):

(1) Has a MAXSNRM setting, but this function still is left to a DSL receiver to implement.

(2) The ATU-R (as the downstream receiver) and ATU-C (as the upstream receiver) are limited to a 14.5 dB maximum power reduction request for gain settings, which are now set absolutely in gain swaps and not done relative to last gain swap. The range is now from −14.5 to [+2.5+EXTGI], so it still is limited to a maximum power reduction of 14.5 dB (EXTGI≧0, and usually is equal to 0; EXTGI is something the transmitter tells the receiver during early training it can accommodate during later gain swapping). A larger EXTGI of up to the limit of 18 dB allows a modem that has reduced power for any reason to increase its power during live operation to respond to a new larger noise that may have occurred during live operation.

(3) Power Cut Back (PCB) in ADSL2 allows the receiver to reduce power (only during training) by an additional 0, 1, . . . , 40 dB, so the ability to observe MAXSNRM is improved. The ADSL2 standard provides that the largest PCB requested by either transmitter or receiver should then be implemented. MAXNOMPSD is still only one operator-controlled parameter in ADSL2 that applies to the entire band, but a wider range of this parameter is accommodated in ADSL2 than in ADSL1.

(4) The initial flat PSD mask can be programmed according to a MAXNOMPSD parameter, which is between −40 (and −37 in certain reach-extended Annexes of ADSL2 known as READSL) and −60 dBm/Hz in 0.1 dB steps.

(5) Some manufacturers' ATU-R receivers may still ignore power back off and it is unfortunately not tested, even in the DSL Forum's new test procedure called WT-85 (though there is a test, nearly all would pass it and there is no verification in that test that the MAXSNRM is observed). No band preference (that is frequency-dependent imposition of a PSD-MASK) is possible in the ADSL2 standard itself.

(6) Gain swapping during live SHOWTIME is no longer limited to +/−2.5 dB and all symbols (there is still a synch symbol every $69^{th}$) have the same level. However, only gain-swapping of up to a reduction −14.5 dB relative to training levels (not last level as in ADSL1) is possible. A gain increase of up to 2.5+EXTGI is particularly useful if the modem started at very low power and a noise arose. If EXTGI is large, then the modem can recover without retraining. EXTGI is limited to 18.0 dB in ADSL2.

ADSL2+-G.992.5 Standard (Also Referred to Herein as the "ADSL2+ Standard" or "ADSL2+"):

(1) Same as ADSL2, except for the introduction of the PSDMASK parameter that is implemented through the tssi parameters. The tssi are additional parameters like the gains in gain swapping, except that the tssi can be fixed externally.

VDSL1, VDSL2, HDSL and SHDSL

The current version of the proposed VDSL1 standard, or G.993.1 has limited definition of MIB-controlled (or operator-controlled) procedures for power reduction (the DSLAM or line terminal (LT) modem manufacturer has a complete PSDMASK specification internally but access to it via MIB is at best not-yet-well-defined in G.993.1). An enumeration of the G.993.1 standard's maintenance capabilities appears in DSL Forum Document TR-057, however the MIB controlled section of TR-057 is currently empty. Thus, VDSL has no standardized mechanism for setting MAXNOMPSD externally, but does have an internal mechanism for reducing power in 0.25 dB steps (called manual power control) between 0 and 40 dB for upstream and 0 and 12 dB for downstream, with respect to nominally imposed standard limits (there are two mask levels and corresponding transmit power levels downstream and upstream that can be set programmably in G.993.1 compliant modems—so the power reduction is with respect to these, some of which are not yet specified). VDSL also specifies a MAXSNRM (but again it is not clear who specifies this). Thus, VDSL has many of the same capabilities as ADSL1 and ADSL2/2+. These capabilities may become standardized for operator interface in an MIB in future documents that could allow many of the same capabilities as ADSL1, ADSL2 and ADSL2+. However, VDSL1 also does not have the rich set of reported diagnostics of ADSL2 and ADSL2+, or apparently even ADSL1, so the ability to diagnose a problem accurately may be more difficult. Again, future generations of TR057 or G.997.x may address these deficiencies of current VDSL MIB interfaces.

VDSL2 is still in very early stages, but it appears that it will have essentially the same MIB features as ADSL2+. HDSL does not appear in any form to have any power back off features. HDSL (now upgraded to SHDSL, G.991.2) has a target SNR (or TSNRM) and a reported SNRM, but no MAX-SNRM. The bandwidth is fixed for any of a few data rates (basically 384, 768, 1.5, 3, . . . ) symmetric and the same modulation in both directions with some standardized shaping. A flat PCB of 0, . . . , 31 dB can be imposed. There is no FEC to protect against impulses at all, so it is unlikely that PCB is used much. Moreover, SHDSL tends to run at the maximum rate possible on short lines, so its margin typically will be close to the TSNRM of 6 dB.

DSM Report, still in its draft stages, currently has all the MIB capabilities of ADSL2+ in it in both directions, and applies to all DMT transmission methods, ADSL1 through VDSL2 and beyond. FEC also can be specified.

As will be appreciated by those skilled in the art, in many DSL systems, including ADSL1 and ADSL2 systems, operational characteristics and rules typically have been set for a static mode of operation to accommodate worst-case scenarios in the systems. That is, users do not always realize the full benefits of DSL systems because of inadequate standards, equipment limitations and the deficiencies of generally accepted operational procedures and conventions. For example, power-margin limits are rarely observed or may be in conflict with or between various standards or interpretations of those standards. Such disregard for service-provider-imposed and/or standards-decreed limits creates problems for users, including excessive crosstalk. Similarly, impulse noise can be a significant problem in some DSL systems. To address impulse noise, current systems use manufacturer-supplied default settings for many operating parameters (such as margin). The applicable standards intended to allow the service provider to set these parameters, yet they may or may not be implemented properly by the various vendors' DSL modems or equipment.

Even where a majority of users (that is, their modems) in a binder are standards compliant, a single user can prove to be a significant source of service deterioration or other damage to other users' DSL service. For this reason, while the standards have provided guidance, even minimal non-compliance can present significant problems in current systems.

Static operation (for example, when DSL service uses manufacturer-set default settings in a DSL modem) means that the DSL service cannot adjust and/or adapt to changing line and environmental conditions in the subscriber line, again forgoing and/or diminishing the benefits available in such DSL systems and failing to realize the potential available to one or more users in such systems. As will be appreciated by those skilled in the art, the widely varying standards, equipment, implementation rules (or lack thereof) and practices mean that, despite detailed standards concerning operation of these various DSL systems, consistent service and service quality is challenging. Because the modems and other equipment may or may not actually comply with the appropriate standards and, as or more importantly, the fact that a user's neighboring lines may or may not use standards-compliant equipment and practices, many users suffer poor or less than optimal service.

Systems, devices, methods and techniques that allow users to adjust and adapt transmission power margin(s), power spectral densities, and the like dynamically to changing DSL environmental and operational situations would represent a significant advancement in the field of DSL operation. Moreover, monitoring and evaluation of the power, margins, etc. used in the DSL environment and operation by an independent entity can assist, guide and (in some cases) control users' activities and equipment, and likewise would represent a significant advancement in the field of DSL operation.

BRIEF SUMMARY OF THE INVENTION

Controlling margins in a DSL modem pair is based on collected operational data. The operational data is analyzed and at least one modem in the modem pair is instructed to use a margin-related parameter value calculated to assist the modem pair in meeting a margin target, such as a margin limit imposed by a DSL standard or the like. Embodiments of the present invention can be used in connection with ADSL1, ADSL2, ADSL2+, VDSL and other types of DSL systems and equipment.

A controller, such as a DSM Center, a "smart" modem and/or computer system can be used to collect and analyze the operational data. The controller and/or other components can be a computer-implemented device or combination of devices. In some embodiments, the controller is in a location remote from the modems. In other cases, the controller may be collocated with one of or both of the modems as equipment directly connected to a modem, thus creating a "smart" modem.

The margin-related parameter value may be a PSD-related value, such as the MAXNOMPSD or MAXNOMATP parameter used by various ADSL systems. In some embodiments, the margin-related parameter value may be a shaped spectral mask for use in transmissions and/or may be caps or limits on bit loading for frequencies used in transmissions between the modems. In some cases, preference bands can be imposed to direct modems to favor and/or avoid certain frequencies.

The operational data may include historical data relating to prior performance of the modem pair and prior margin compliance. Also, the operational data may include one or more modem operational parameters that are the same as or different from the margin-related parameter whose value is regulated by the controller. The historical data may be maintained in a database. The operational data may further include data collected from the DSL system in which the modem pair operate, for example from one more MIBs or other data sources. The operational data may be sent to the controller by communication means internal and/or external to the DSL system itself. Some other types of operational data that can be evaluated include data pertaining to crosstalk between the modem pair and neighboring DSL lines, a history of margins previously used by the modem pair, retrain counts (that indicate that MAXSNRM may be set too low if the retrain count levels are high), transmit power levels previously used by the modem pair, data rates previously used by the modem pair, and/or data regarding previous error behavior of the modem pair.

In another embodiment of the invention, a distribution of margins based on operational data may be estimated as a function of data rate. Using the estimated margin distribution, a distribution of performance parameters also is calculated, including the probabilities of line outages and probabilities of one or more error parameters exceeding minimum levels. Data rates and/or other performance-related parameters may be set on the basis of the estimated performance of the system using various margin settings and levels.

Methods according to the present invention may be performed by a controller, a DSM Center, a "smart" modem, a computer system and the like. Moreover, computer program products for performing these methods also are disclosed.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which:

FIG. 5A is a flow and schematic diagram showing operation of an ADSL1 system according to one embodiment of the present invention.

FIG. 5B is a flow and schematic diagram showing operation of an ADSL1 system according to one embodiment of the present invention.

FIG. 6A is a flow and schematic diagram showing operation of an ADSL2 system according to one embodiment of the present invention.

FIG. 6B is a flow and schematic diagram showing operation of an ADSL2 system according to one embodiment of the present invention.

FIG. 9 is a pair of bit loading energy tables.

DETAILED DESCRIPTION OF THE INVENTION

Figure 1:
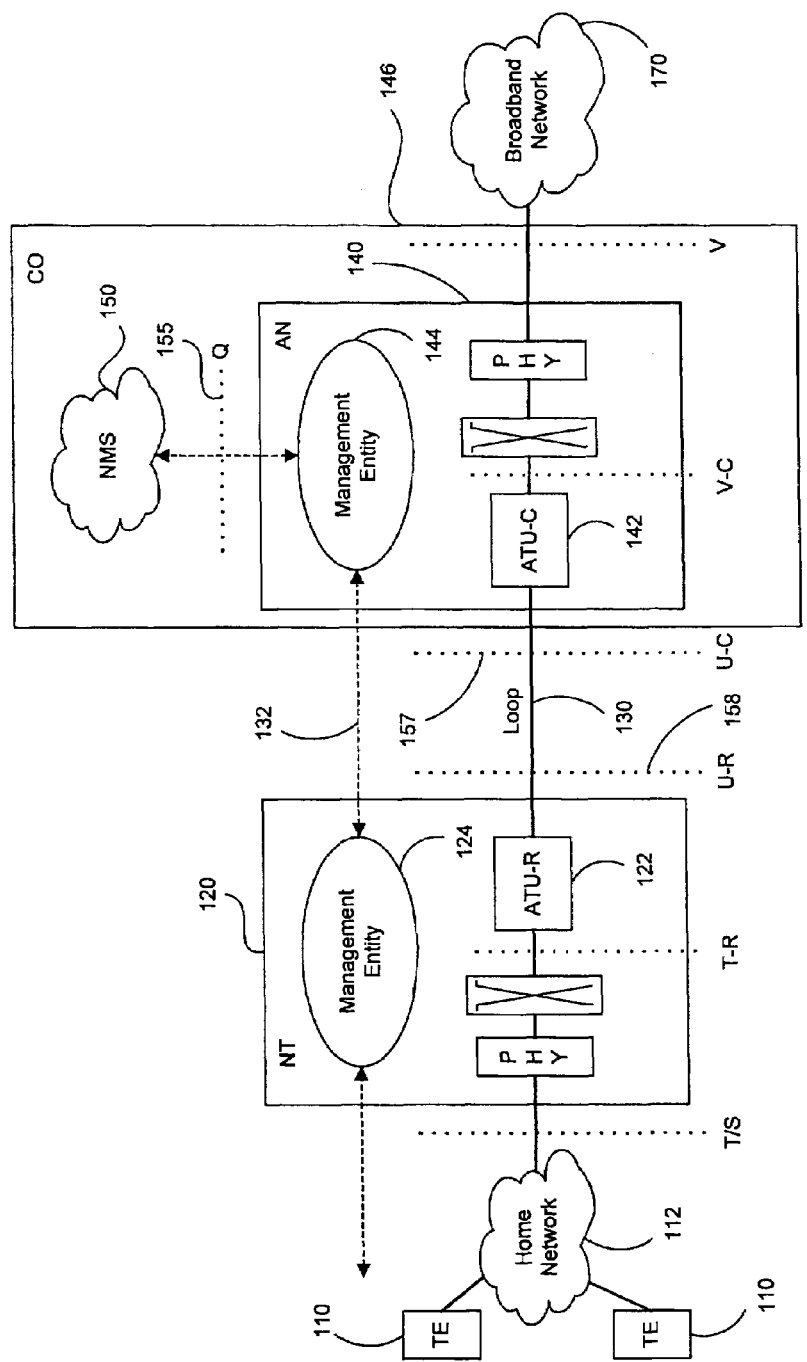
FIG. 1 is a schematic block reference model system according to the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these illustrative embodiments.

It should be kept in mind that the specifics provided herein are for purposes of illustration and that the present invention is broader than any one example. Therefore, the present invention should be construed as broadly as possible and permitted.

Generally, embodiments of the present invention will be described in connection with the operation of a DSL system having a controller (for example, a computer system, a "smart" modem, a dynamic spectrum manager, a Spectrum Management Center (SMC), and/or a Dynamic Spectrum Management Center (DSM Center) as described in publications and other documents relating to this field, or any other suitable control device and/or entity, including a computer system). When the term "controller" is used herein, it is intended to mean any or all of these or any other suitable control means. A controller may be a single unit or combination of components that are a computer-implemented system, device or combination of devices that perform the functions described below.

As will be appreciated by the those skilled in the art, after reading the present disclosure, embodiments of the present invention may be adapted to operate in various DSL and other communication systems known to those skilled in the art. A dynamic spectrum manager or other controller managing a communication system using one or more embodiments of the present invention may be a service provider and/or operator (which in some case may be a CLEC, ILEC or other service provider) or may be a party partially or completely independent of the system operator(s).

Generally, when more parameters are monitored and are adjustable in a communication system, rather than being statically set, performance can be improved, often dramatically (for example, higher data rates can be realized, more users can be serviced, less power may be consumed, etc.). That is, if system settings are set adaptively as a function of the performance history of a line or channel, adaptive changes to system operation can improve the data rates and other service for users. As an example, no system currently exists for dynamically monitoring a large number of parameters, characteristics, etc. and assisting operators and users in optimizing DSL services. Some operators have constructed rudimentary forms of collecting DSL line data and have attempted either:

to increase the data rate available after initial service installation until a properly functioning acceptable rate is observed (referred to as "provisioning"); and/or to observe a line's bit error rate over time to determine whether re-provisioning at a lower data rate is needed.

In particular, the rules for increasing or decreasing data rates in these systems often are oversimplified, fixed functions of one or very few input parameters. Systems according to embodiments of the present invention that accept and analyze more inputs and become, in essence, dynamic functions of a few parameters based on the observation and processing of the many other observed parameters and history of the line performance constitute a significant improvement in this field.

To reduce performance problems of various types, including crosstalk interference, many communication systems limit the power that may be used by transmitters sending data within a given system. The margin of a transmission system is the level of transmit power (typically expressed in dB) over the minimum power needed to achieve a desired performance (for example, a threshold bit error rate, or BER, of the system). The basic goal is to use sufficient power to overcome and/or compensate for noise-induced errors and interference-induced errors, while minimizing the power needed for transmission to reduce the potential problems occasioned by excessive levels of transmission power. In many cases, however, equipment manufacturers, system operators and others use such excessive power (leading to excessive margins) in an effort to provide high data rates and to take an easier approach to dealing with potential problems like crosstalk.

The present invention uses information about line characteristics (for example, operational data) to more carefully evaluate acceptable problem/interference avoidance and data rates in power adaptive systems and methodologies. This is done by analyzing the available information and/or operational data and then training and setting modems to operate at power transmit levels (and thus margins) that will provide sufficient power for acceptable data transmission while minimizing the deleterious effects that one user's line might have on other users' lines. More specifically, embodiments of the present invention can generate margin-related parameters and instruct at least one modem in a modem pair to use one or more such margin-related parameters to assist the modem pair in meeting a given margin target.

FIG. 1 shows a reference model system, with which embodiments of the present invention can be used, according to the G.997.1 standard (also known as G.ploam), which is well known to those skilled in the art. This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+ (G.992.5) and the G.993.x emerging VDSL standards, as well as the G.991.1 and G.991.2 SHDSL standards, all with and without bonding. This model is well known to those skilled in the art.

The G.997.1 standard specifies the physical layer management for ADSL transmission systems based on the clear, embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data (which includes performance data) that is available at an access node (AN).

In FIG. 1, users' terminal equipment 110 (sometimes also referred to as "customer premises equipment" or CPE) is coupled to a home network 112, which in turn is coupled to a network termination unit (NT) 120. NT 120 includes an ATU-R 122 (for example, a transceiver defined by one of the ADSL standards) or any other suitable network termination modem, transceiver or other communication unit. NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores, among other things, operational data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1, ATU-C 142 is located at an access node (AN) 140 in a CO 146. An ME 144 likewise maintains an MIB of operational data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1 are used for determining and collecting operational data. The Q-interface 155 provides the interface between the Network Management System (NMS) 150 of the operator and ME 144 in AN 140. All of the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the operations, administration and maintenance (OAM) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2). The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational data maintained in their respective MIBs.

As will be appreciated by those skilled in the art, at least some of the parameters described in these documents can be used in connection with embodiments of the present invention. Moreover, at least some of the system descriptions are likewise applicable to embodiments of the present invention. Various types of operational data available from a DSL NMS can be found therein; others may be known to those skilled in the art.

In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk due to its being far from other active pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
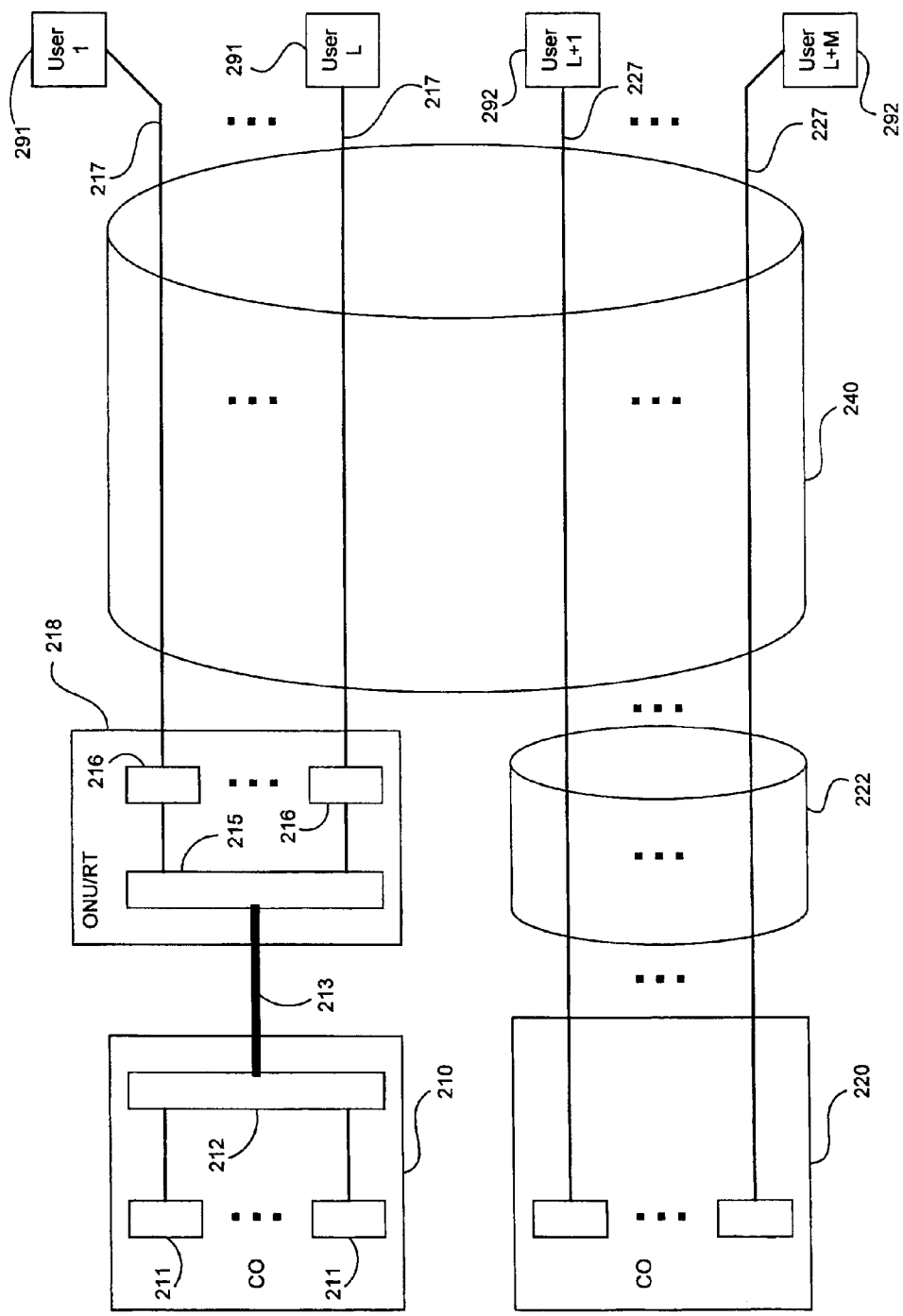
FIG. 2 is a schematic block diagram illustrating a generic, exemplary DSL deployment.

A generic, exemplary DSL deployment scenario in which embodiments of the present invention can be used is shown in FIG. 2. All the subscriber loops of a total of (L+M) users 291, 292 pass through at least one common binder. Though the loops in FIG. 2 are shown as approximately the same length, it is more likely that the loops of a given system would be of varying lengths, and in some cases widely varying lengths. Each user is connected to a Central Office 210, 220 through a dedicated line. However, each subscriber loop may be passing through different environments and mediums. In FIG. 2, L users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218, which may also be referred to as a remote terminal (RT). Modems 216 in ONU 218 act as transceivers for signals between the ONU 218 and users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder. Users L+1 to L+M could be a Remote terminal (instead of CO) and the users 1 to L could be even closer to customers, perhaps serviced by a line terminal or some other fiber fed terminal (thus two fiber fed terminals with one closer to customers than the others).

As can be seen in FIG. 2, the lines from CO 220 to users 292 share binder 222, which is not used by the lines between CO 210 and users 291. Moreover, another binder 240 is common to all of the lines to/from CO 210 and CO 220 and their respective users 291, 292.

Figure 3:
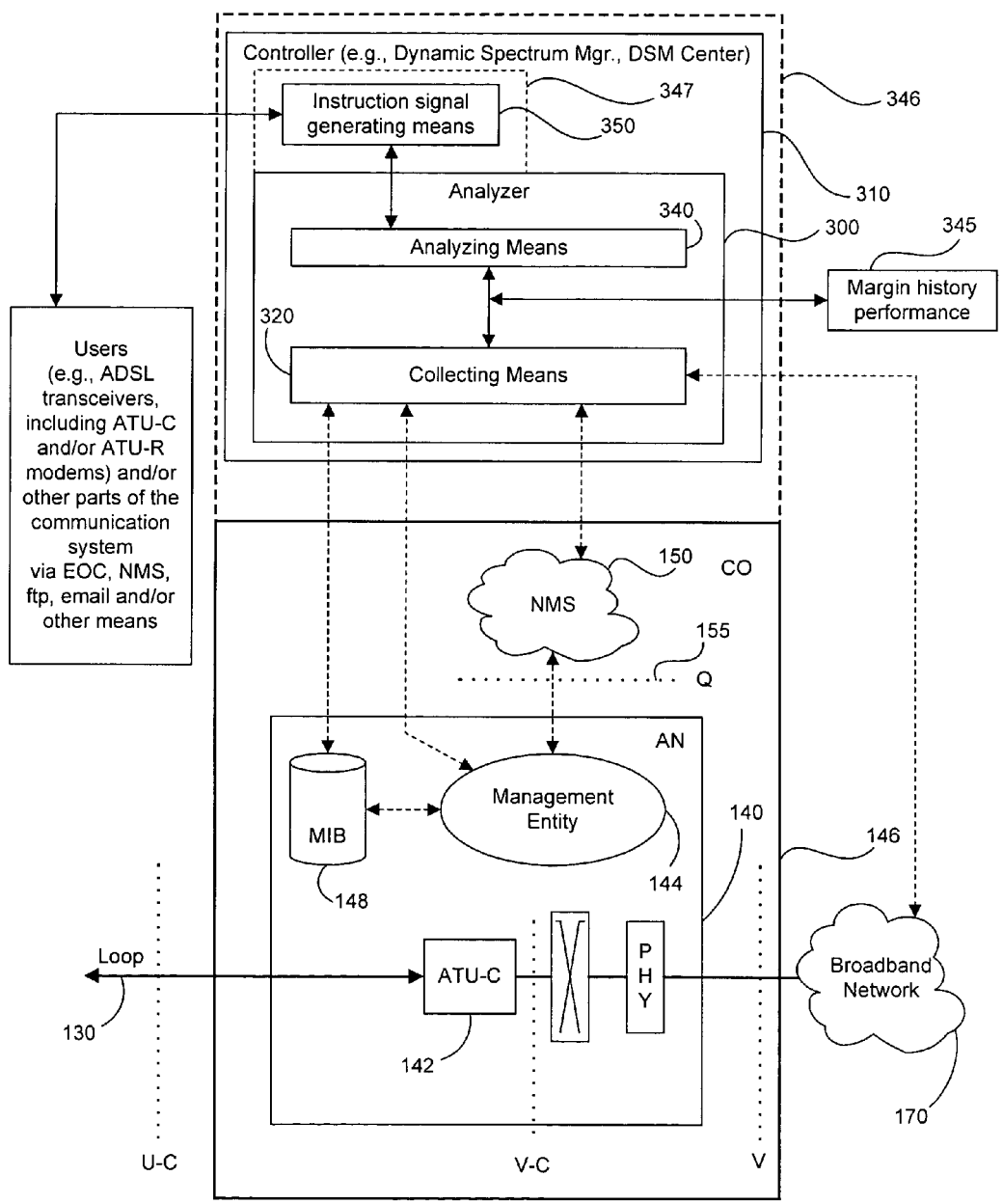
FIG. 3 is a schematic block diagram of one embodiment of the present invention in a DSL system utilizing a controller such as a DSM Center.
Figure 12:
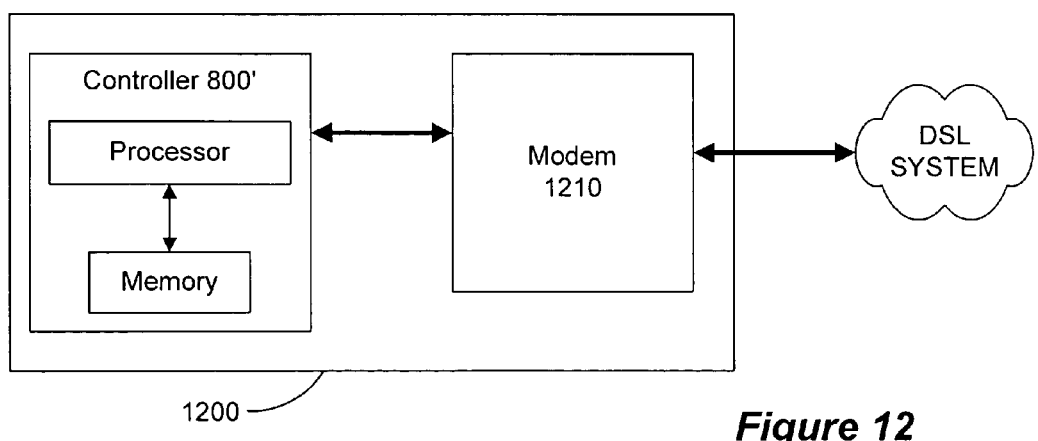
FIG. 12 is an embodiment of the present invention showing a "smart" modem unit having a controller comprising a processor and memory integrated with a DSL modem.

According to one embodiment of the present invention shown in FIG. 3, a margin and power analyzer 300 may be part of an independent entity monitoring a DSL system as a controller 310 (for example, a dynamic spectrum manager or dynamic spectrum management center) assisting users and/or one or more system operators or providers in optimizing or otherwise controlling their use of the system. (A dynamic spectrum manager may also be referred to as a Dynamic Spectrum Management Center, DSM Center, System Maintenance Center or SMC.) In some embodiments, the controller 310 may be operated by an ILEC or CLEC operating DSL lines from a CO or other location. In other embodiments, such as the example in FIG. 12, a "smart" modem unit 1200 has a controller 800' (having, for example, a processor and memory) integrated with a modem 1210 in a user location, a central office or some other single location. As seen from the dashed line 346 in FIG. 3, controller 310 may be in or part of the CO 146 or may be external and independent of CO 146 and any party operating within the system. Moreover, controller 310 may be connected to and/or controlling multiple COs. Likewise, components of controller 310 may or may not be in the same location and/or equipment, and/or may instead be accessed by the controller at different locations.

In the exemplary system of FIG. 3, the analyzer 300 includes collecting means 320 (which also may perform monitoring, if desired) and analyzing means 340. As seen in FIG. 3, the collecting and/or monitoring means 320 may be coupled to and may collect data through and from sources internal to the DSL system, such as NMS 150, ME 144 at AN 140 and/or the MIB 148 maintained by ME 144. Data also may be collected from external sources by means 320 through the broadband network 170 (for example, via the TCP/IP protocol or other means outside the normal internal data communication systems within a given DSL system). For example, the controller may collect operational data from an ATU-R over the internet or even an ATU-C over the internet if the EMS is hostile or bandwidth is limited. Operational data also can be collected from the NMS of the service provider, which may be collecting from various sources itself.

Analyzing means 340 and/or monitoring/collecting means 320 may also be coupled to a source 345 of margin performance or history, such as a database or memory that may or may not be part of the analyzer 300 or controller 310. One or more of the analyzer's connections allows the analyzer 300 to collect operational data. Data may be collected once (for example, during a single transceiver training) or over time. In some cases, the monitoring means 320 will collect data on a periodic basis, though it also can collect data on-demand or any other non-periodic basis, thus allowing the analyzer 300 to update its user and line data, if desired.

The analyzing means 340 is capable of analyzing data provided to it to determine whether instructions need to be sent to one or more modems to assist the modems in meeting a given margin target. The analyzing means 340 of analyzer 300 is coupled to an instruction-signal generating means 350 in the controller 310. Signal generator 350 is configured to accept a margin-related parameter value generated by the analyzing means 340 for use by a modem, where the margin-related parameter value is based on the operational data and is calculated to assist at least one modem in meeting a margin target, and to send instruction signals (for example, a requested or required MAXNOMPSD value, PSDMASK setting or other instructions such as CARMASK, MAXSNRM, MINSNRM, TSNRM, MAXNOMATP, MAXRXPWR, or any of the rate-adaptive margins or timers) to users in the communication system (for example, ADSL transceivers such as ATU-Cs). As indicated by the dashed line 347, the instruction signal generating means 350 may or may not be part of the analyzer 300 and/or be implemented in the same hardware, such as a computer system. Instruction signal generator 350 constitutes a means for regulating one or more margin-related parameter values in the modem pair.

As will be appreciated by those skilled in the art, if the controller is a wholly independent entity (that is, not owned and/or operated by the company owning and/or operating lines within the CO), much of the DSL system's configuration and operational information may be unavailable. Even in cases where a CLEC or ILEC operates and/or functions as the controller 310, much of this data may be unknown. Various techniques may be used for estimating needed data and/or information. One example of such techniques can be found in U.S. Ser. No. 10/817,128, entitled DSL SYSTEM ESTIMATION AND PARAMETER RECOMMENDATION, filed Apr. 2, 2004, and owned by Adaptive Spectrum and Signal Alignment, Inc., which is incorporated by reference in its entirety for all purposes.

Figure 8:
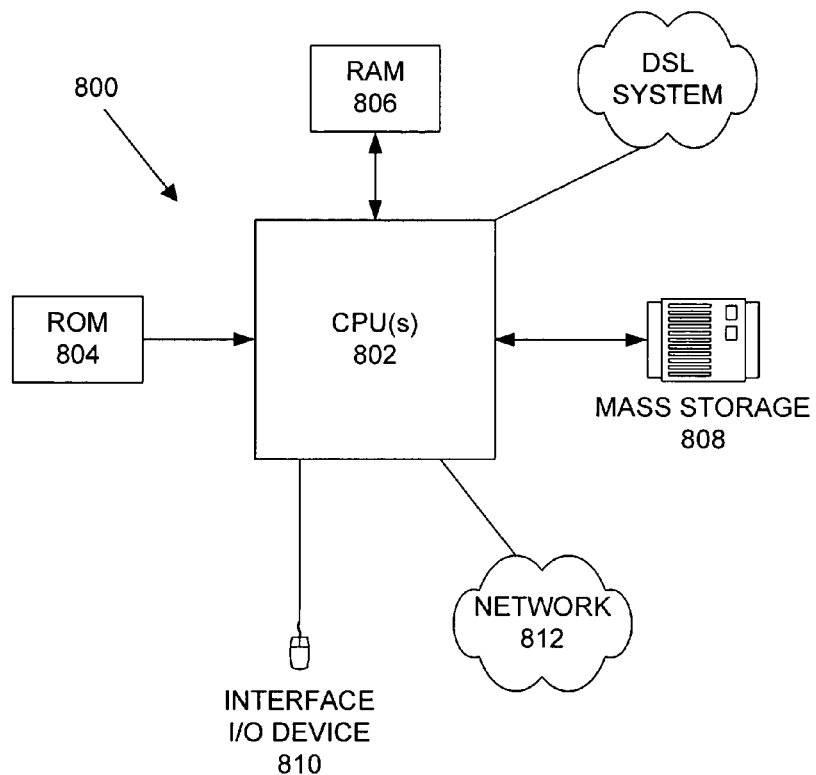
FIG. 8 is a block diagram of a typical computer system suitable for implementing embodiments of the present invention.

In some embodiments of the present invention, the analyzer 300 may be implemented in a computer such as a PC, workstation or the like (one example of which is disclosed in connection with FIG. 8). The collecting means 320, analyzing means 340 and/or instructing signal generating means 350 may be software modules, hardware modules or a combination of both, as will be appreciated by those skilled in the art. These components may all reside in the same computer system, for example, or may be in distinct apparatus. For management of large numbers of lines, databases may be introduced and used to manage the volume of data generated by the lines and the controller.

Figure 4C:
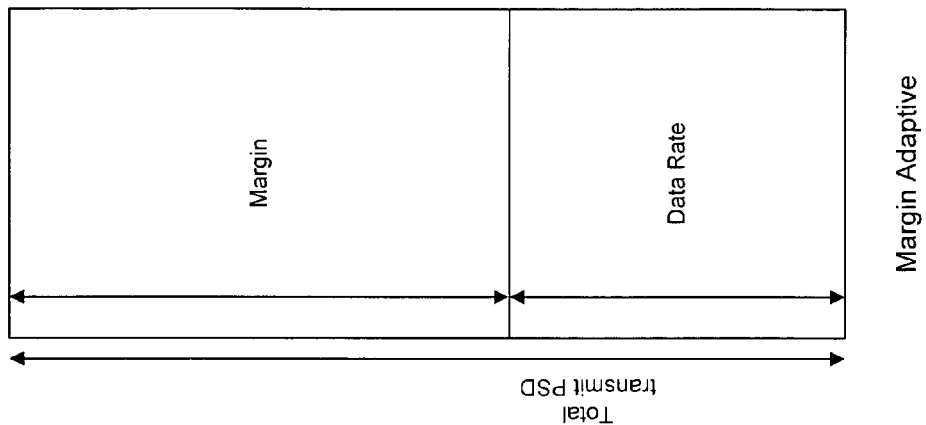
FIGS. 4A, 4B and 4C are comparative depictions of power adaptive, rate adaptive and margin adaptive implementations of DSL systems.
Figure 4B:
Figure 4A:
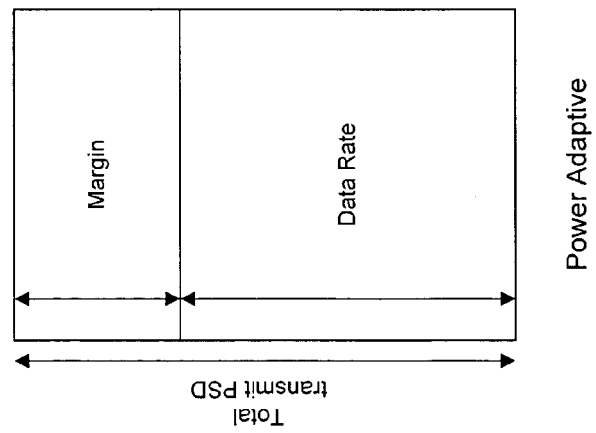

The configuration of FIG. 3 can be used to implement power adaptive systems and methods according to embodiments of the present invention. As seen in FIG. 4A, power adaptive systems such as those included in the present invention reduce and/or minimize power consumption while maintaining a target data rate (for example, a minimum data rate) and target noise margin. Rate adaptive systems and methods, illustrated in FIG. 4B, use all available power (the total transmit PSD, usually at a fixed level) to maximize the data rate while maintaining the target margin level. Margin adaptive systems and methods, illustrated in FIG. 4C, use all available power again, in this case to maximize the margin while maintaining a fixed data rate. Current deployment of ADSL typically follows the margin adaptive techniques of FIG. 4C, often to the detriment of users and operators. Whenever excess power is used, either to unnecessarily boost the data rate or to provide an excessive margin level, crosstalk and other problems can arise for users and operators. Unlike the excessive power systems, power adaptive techniques such as those of the present invention provide reliable data rates, minimum power consumption and sufficient margin to ensure reliable error and interference avoidance.

ADSL field operations have taught that modems, while frequently claiming compliance with a plethora of emerging, volatile DSL standards, often interpret all the various quantities, rules and guidelines in different ways for different manufacturers (and, indeed, for different generations and versions of the same manufacturer's hardware and software). Moreover, various interoperability tests, including those currently near release, do not adequately address all the various possible configurations and power levels, leaving wide uncertainty as to actual field conditions. Using the present invention, a controller imposes and enforces consistent operational guidelines and implementations to reduce, increase and/or maintain power and/or PSD levels to prevent problems such as excessive crosstalk between modems. Furthermore, the controller can experiment with various settings not normally imposed by or during expected operation of standard-compliant products to ascertain the cause/effect and time variation of DSL environments so that combinations of rate/performance/price offerings for DSL service to customers in binders with varying degrees of crosstalk and customer topology can produce maximum service performance and/or revenue.

Time variation information and techniques correspond to ADSL2 modes known as dynamic rate adaptation. The specific parameters in G.997.1 for this are known as RA-USNRMus/ds and RA-DSNRMus/ds (rate adaptive upshift/downshift signal-to-noise-ration margin, upstream or downstream) and allow setting of a margin target that must be achieved before the rate can go up or down. RA-USNRMus is a level to which the modem's computed margin is compared. If that computed margin exceeds USNRMus for a period of RA-UTIME or longer, then the data rate can be increased without retraining in ADSL2. After the rate increase, the margin will be less than before the rate increase. If the computed margin is now less than USNRMus, then the modem's computed margin is compared to RA-DSNRMus and if greater than this value, the modem stays at the same data rate. If the margin now or at any time is below RA-DSNRMus for a time period exceeding RA-DTIMEus, the modem data rate is decreased until the margin again exceeds RA-DSNRMus. There will always be a maximum rate at which the rate-adaptation stops and then MAXSNRM applies there. The margin targets must be maintained for a time period specified by the DSM Center via another control-parameter RA-UTIMEus/ds or RAD-TIMEus/ds (rate adaptive upshift/downshift time, upstream or downstream).

Figure 7:
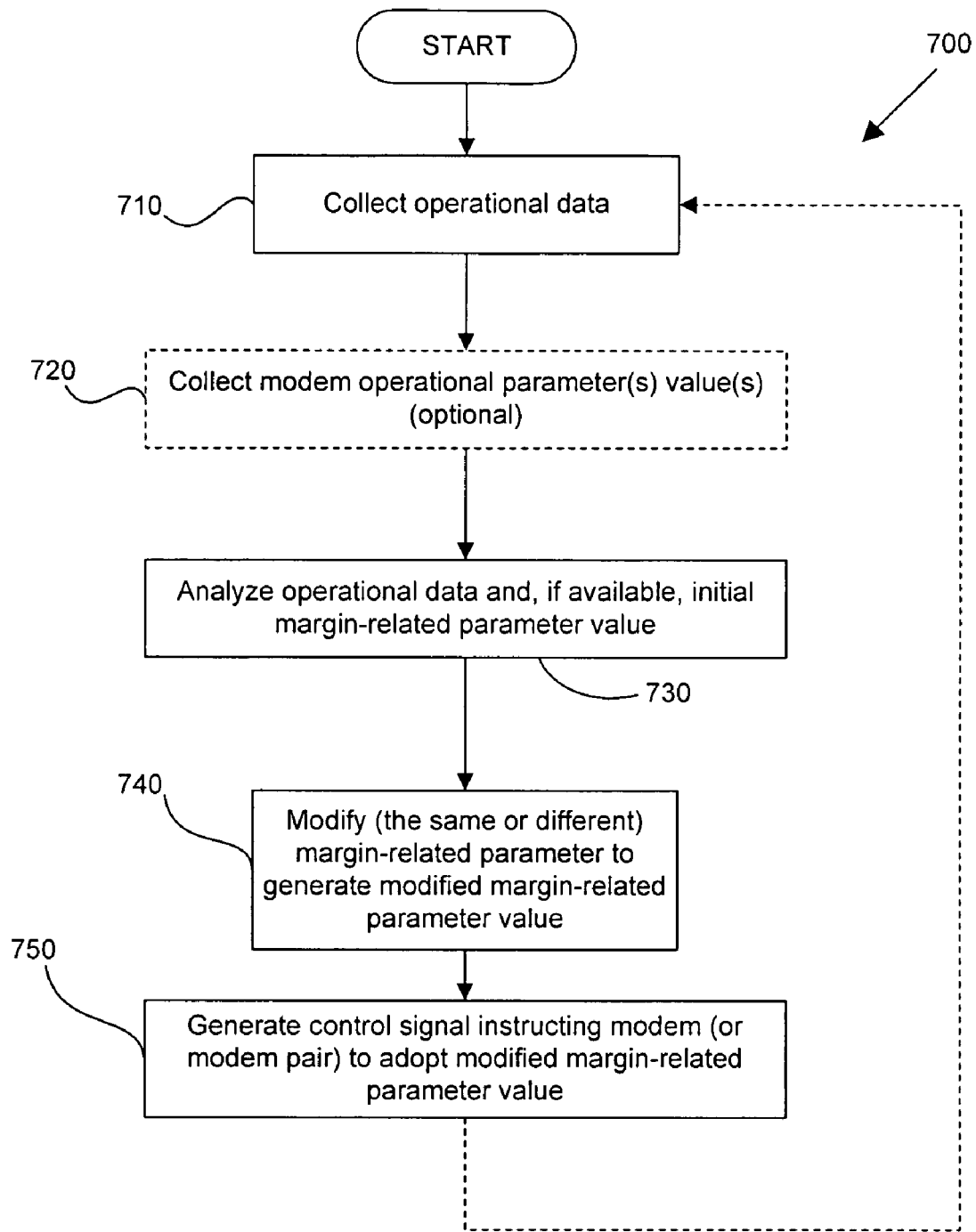
FIG. 7 is a flow diagram showing a method according to one embodiment of the present invention.

Generally, as shown in flow diagram 700 of FIG. 7, the controller collects operational data (typically relating to the DSL modem pair of interest) at 710. The operational data may include historical margin performance of the DSL system, historical performance data (such as previously measured and known margin levels for the modem pair and other performance-related information), current performance data relating to the DSL modem, retrain count data, other data relating to training of the modem, or error data.

Data may be collected using the DSL system's internal communication system(s) and/or using external communication (for example, the internet). The operational data might include information regarding one or more modem operational parameter values being used or set by the modem pair, which is collected at 720.

At 730 the controller analyzes the operational data to determine what margin-related parameter values might assist the modem pair in meeting a margin target or otherwise enhance performance of the modem pair. The controller may then generate a margin-related parameter value at 740. The margin-related parameter value may be for a modem operational parameter that the controller has considered or may be a different margin-related parameter. At 750 the controller generates an instruction signal representing the margin-related parameter value and sends that to at least one modem in the modem pair, thus instructing the modem pair to adopt the margin-related parameter value for use in training or in normal operation, depending on the circumstances.

The controller may update operation of the modem pair by performing such an analysis more than once, as shown by the dotted arrow in FIG. 7, or may do it only at specified times, such as immediately before modem training. As will be discussed in detail below, the parameters with which the controller works and operational data available to the controller varies, depending on the type of DSL system in which the modem pair operates. Again, the modem operational parameter(s) used by the controller in analyzing the modem margin performance may or may not be the same parameter as that for which the margin-related parameter value is generated and sent to the modem. While not limited to such types, embodiments of the present invention are helpful in assisting modems employing ADSL1, ADSL2, ADSL2+ and/or VDSL. Use of the controller may assist in making sure that standards-compliant modems remain compliant. Moreover, embodiments of the present invention can be used to enhance performance of one or more DSL lines by taking into account operational data like crosstalk effects and other information that can have a deleterious effect on DSL performance.

The basic idea is that the spectrum level, power, spectrum shape, etc. may all be changed in response to reported margin history/distribution. In other words, after evaluating data about prior performance of a modem pair, and knowing one or more of the modem pair's margin-related parameters, a controller or the like can suggest or force the modem pair to adopt operational values that will assist the modems in meeting one or more margin targets, whether imposed by a standard or not.

In some embodiments of the present invention, a controller coupled to the ATU-C side of a modem pair dynamically controls margin settings and adjustments for each line (for example, in an ADSL2 system, by setting and/or changing the MAXSNRM parameter, by imposing a different MAXNOMPSD level, or by setting the PSDMASK in an ADSL2+ modem or by combinations of some or all of these, or some of the other parameters previously mentioned such as CARMASK, MAXSNRM, TSNRM, MINSNRM, RA-margins/timers). Such dynamic margin setting by imposition of a lower mask is not part of any standard. Even those that attempt to obey the margin and power rules may be limited by the range of PCB allowed or may be limited by not having available a history of information from earlier trainings and use of the line (possibly with other modems and/or other customers who may have previously resided at the end of the line). Thus, in another embodiment, the controller may see from a history of reported margin measurements that the line is exceeding a desired margin target and thereby impose a lower PSD level during or before training by the mechanisms discussed above. That has not been done in earlier systems because users and operators did not really know the anticipated performance level and thus did not want to unnecessarily weaken a modem in the event that it might see high noise during operation. Similarly, if for some reason a modem is not using sufficient power and/or margin and is experiencing excessive noise and error problems, the controller can instruct the modem to use a higher PSD level during training or operation to permit better operation.

As noted above, it may be preferable in some systems to use a historical, previously measured and/or known margin to "seed" the training process so that an appropriate power reduction is implemented during training. The controller can maintain or have access to a performance history, thus allowing the controller to continuously improve estimations and decisions concerning what PSD or other margin-related parameters to instruct the modem to use when the modem is reset or retrains (which can be forced or recommended, if appropriate). For example, a service provider or controller may wait until the line is inactive—for example, counting ATM cells or other customer information-passing measures to know when the line is active or not—and then reset to use the newer PSD(s) in a manner completely transparent to a user. In other situations, the service provider may simply retrain at a time when the system is very unlikely to be in use (for example, in the middle of the night). In some embodiments, the controller can use this historical information, telling the one or both of the modems in the modem pair (for example, the ATU-C) what initial PSD level should be used so that an available PCB value or other adjustment (for example, a –14.5 dBm drop by the ATU-R) has a chance of meeting the margin specification.

In some embodiments of the present invention, programming is based on either previous use(s) or training. The previous uses may be more important in some cases. A second pass through training, which also can be used, essentially is a quick fix for the modem vendors themselves, particularly for downstream transmission with the DSLAM vendors, where the modems can essentially stop the current training and then commence training from the beginning a second time with a different, lower NOMPSD that causes the margin then to be less than MAXSNRM.

Some embodiments of the present invention combine respecting the ADDNMR limit by initializing the PSDMASK setting using previous knowledge. Optimal Spectrum Management (OSM), which is known to those skilled in the art, has been studied and has shown some gains from Level-2-coordinated spectrum management by a dynamic spectrum manager, DSM Center or other controller over already large gains of theoretical iterative water-filling, which has been addressed in earlier systems. "Level 2" means a controller such as a DSM Center can jointly coordinate the spectrum levels (for example, on the basis of perceived crosstalk between two or more lines). Level 1 means setting spectrum only on the basis of observations from the same one line. Level 0 means no capability to do DSM. Further information on OSM can be found in various contributions to the T1E1.4 Working Group of ANSI, including Contributions T1E1.4/2003/325, T1E1.4/2004/459 and T1E1.4/2004/460, which are incorporated herein by reference for all purposes. The central coordination required for OSM, however, renders the gains difficult to achieve in a practical system because of the need to control spectra centrally. In embodiments of the present invention, use of the PSDMASK of G.997.1 for the emerging DSM Report of ANSI T1E1.4 and likely for VDSL2 allows the usual discrete-integer water-filling to realize essentially comparable performance as OSM by simply setting a few flat PSD masks in different segments of a DSL modem's used frequencies. The levels of these bands may be increased or decreased until a desired combination of data rates is achieved among users, who still continue to bit-swap or load in the normal manner while observing the particular PSDMASK constraints applicable to each and every tone. Reported margins may correspond to worst-case margins and MAXSNRM is typically applied only to the tone with the smallest margin. Manufacturers may not use best loading or bit-swapping algorithms, leading to variations and interpretations of the imposed PSDMASK. Thus, a preferred band (or "PREFBAND") bit or indication may be sent to the EM of a modem pair to inform them that discrete-water-fill loading, or an approximation thereto, is desired and that the MAXSNRM parameter should apply to the margins found on all tones (and not just the worst tone). This PREFBAND indication is a portion of this invention.

As noted above, for ADSL1 systems, the MAXNOMPSD value typically is set by the operator. However, using one embodiment of the present invention, one example of which is shown in FIG. 5A, a controller 510 provides a margin-related parameter value (for example, a MAXNOMPSD value) to the ATU-C 530. The controller 510 may send instructions or otherwise communicate with the system using the NMS and/or element management system that can accept the MAXNOMPSD or PSDMASK values from the controller 510. The instruction signal (for example, from instruction signal generating means 350) can be sent to the ATU-C 530 via the NMS, element management system, email, ftp, or in any other suitable way, as will be appreciated by those skilled in the art. The controller also may provide a MAXNOMATP value in addition to or instead of the MAXNOMPSD value in some embodiments. In some cases, the ADSL1 CARMASK procedure (a simple on/off indicator for each tone that is standardized and allowed for operator specification in ADSL1) may also be used in place of or in addition to MAXNOMATP/PSD to turn off carriers in a band producing excessive crosstalk into other DSL systems.

In embodiments of the present invention applicable to ADSL1, the controller 510 calculates a margin-related parameter value to be used by the modems (for example, the MAXNOMPSD value), based on operational data collected by the controller (for example data from an MIB 525 or a historical data module 520) for transceiver training that will lead to a suitable margin during SHOWTIME operation. (NOMPSD is chosen by the transmitter and not an MIB-controlled setting; but NOMPSD must be less than MAXNOMPSD and field practice is for this transmitter to set NOMPSD at the same level of any MAXNOMPSD if that value can be implemented. Some MAXNOMPSDs supplied, say −40 dBm/Hz to an RT that can only implement −44 dBm/Hz, may truly be higher than the NOMPSD.) History/library 520 obtains data from the operator MIB 525 and any other available sources of relevant data about the system's performance. The controller 510 supplies the MAXNOMPSD value or other margin-related parameter value to the ATU-C 530. The controller's supplied MAXNOMPSD value may be calculated so that the system realizes the TSNRM/TARSNRM margin value, the MAXSNRM margin value, a margin value in between these two, or any other desired margin target. The controller may elect to test or project the line's performance under a variety of different kinds of noise situations that have occurred, are presently occurring, or may occur, particularly simulating situations where other neighboring lines also have programmed PSDs.

Because the modem 530 often uses MAXNOMPSD as its NOMPSD value, the new MAXNOMPSD valued supplied by the controller 510 is likely to become the NOMPSD value used by the ATU-C modem 530. Even if the controller-supplied MAXNOMPSD value is not selected as the NOMPSD value by the ATU-C, the NOMPSD value cannot be higher than the supplied MAXNOMPSD value and excessive margins will still be avoided during normal SHOWTIME operation.

The controller thereby forces an upper limit on NOMPSD, even though the controller cannot force the NOMPSD value directly. Thus, if −52 is the desired NOMPSD value, the controller sets MAXNOMPSD to −52. Since NOMPSD cannot be higher than MAXNOMPSD, setting MAXNOMPSD to −52 limits the value of NOMPSD, which in turn limits the level of any resulting margin and avoids excessive margin usage. Usually, MAXNOMPSD is the NOMPSD in the very first transceiver training section of ADSL1 training, though this is up to the vendor, and the controller can thus indirectly force the NOMPSD value used by the ATU-C.

As seen in FIG. 5A, ATU-C 530 starts with NOMPSD usually set to MAXNOMPSD (typically −40 for CO, and −44 for RTs, as shown in step 545. After the ATU-C 530 has received (and reset, if necessary) its MAXNOMPSD value, the ATU-C 530 uses its "controller-induced" or "controller-influenced" NOMPSD to measure the upstream power transmission from the ATU-R 540 and thus estimate the loop length. Based on this estimate, the ATU-C 530 calculates its PCB power drop, if any (for example, pursuant to Annex A of the ADSL1 standard), and informs the ATU-R 540 of this value, setting REFPSD=NOMPSD−PCB, shown as step 550 in FIG. 5A. Using embodiments of the present invention, the PCB value is less likely to cause non-compliance with margin requirements due to consideration and use of the historical data 520 maintained by the controller regarding the line on which modems 530, 540 operate.

The ATU-R 540 then computes margin, bits ($b_i$), and gains ($g_i$) after transceiver training and channel analysis using the REFPSD value. The values of $g_i$ permitted under ADSL1 are −14.5 dB to +2.5 dB. As seen in step 560 of FIG. 5A, the final PSD value for tone i is $PSD_i$=NOMPSD−PCB+$g_i$, subject to the MAXNOMPSD constraint provided initially by controller 510. (In some embodiments of the present invention, the gi values can be the margin-related parameter values and be indirectly controlled by the controller via an instruction signal from the controller to a receiver telling it to lower gains.) Thus, if NOMPSD is MAXNOMPSD, the PCB is 2 dB and $g_i$ for a large group of adjacent tones are +2.5 dB, the final PSD values for all these tones will be limited on average by the MAXNOMPSD constraint to MAXNOMPSD, even though the calculated PSD would have been 0.5 dB above MAXNOMPSD (though this is unlikely to happen in light of the analysis of historical data and the controller's selection of MAXNOMPSD based on prior operational characteristics. Theoretically this could apply to each tone. However, ADSL1 does allow the MAXNOMPSD to be exceeded by up to 2.5 dB on individual tones, but on average over a group of tones, MAXNOMPSD must be observed. In any cases where the combination of PCB and $g_i$ are not positive, the $PSD_i$ value will be at or below NOMPSD.

In this way, the controller-influenced NOMPSD "seeds" this entire process, allowing the controller 510 to bring the eventual margin and any excess margin into compliance with the MIB-supplied MAXSNRM levels defined in the ADSL1 standard (or any other imposed limits). Finally, adjustments can still be made during SHOWTIME using the gain swapping capabilities of ADSL1.

There is no MIB parameter that directly tells the controller 510 what the NOMPSD value is in ADSL1. The controller may base its recommendation/instruction on a training sequence that has just been completed (where the modem pair goes directly into a re-training procedure) or upon other historical data to which the controller has access.

For upstream power reduction, as shown in the example of FIG. 5B, the ATU-R 540 begins by sending a test signal to the ATU-C 530 at a preselected PSD value. For example, in one embodiment ATU-R starts at an original PSD of −38 dBm/Hz, as shown in step 570. The ATU-C 530 measures the line attenuation and estimates the loop length, sending that information back to the ATU-R 540. The ATU-C 530 also calculates the margin, bits and gains for its own operation. The second transmission of the ATU-R 540 is still at its original PSD value, for example, −38 dBm/Hz as shown in step 571. After receiving a second transmission from the ATU-R 540, the ATU-C 530 calculates its gains and can command as much as a 14.5 dB power drop so that, if an initial PSD value of −38 is used by the ATU-R 540, then the final PSD of the ATU-R 540 is between −52.5 and −38 as depicted in step 572.

While the upstream and downstream training/power reduction are separate events, one embodiment of the invention drops the upstream PSD under controller control when the previous margin is high. Upstream crosstalk generally is not bad in DSL, but the high powered upstream signal can cause more echo to leak into downstream signals in user modems. By reducing this echo via the lower non-standard upstream PSD, downstream performance can be lifted several dB (perhaps as much as 10 dB) when echo dominates other noises, as it sometimes does when bridged taps are present. Using this embodiment, a modem will outperform current modems on long loops, where most often this local echo at the user modem seems to be the dominant, range-limiting effect.

After the modems enter SHOWTIME, further adjustments to gains can be made using gain swapping.

In ADSL1 and other systems, a simple option according to one embodiment of the present invention is to measure the margin just before SHOWTIME. If the measured margin is higher than a prescribed limit just before the modems enter SHOWTIME (a MAXSNRM of 16 dB, for example), training is recommenced and the modems retrain on a second pass, using the permitted cutback values. Such an implementation might not be controlled by the DSM Center in most situations and instead could be executed in a proprietary mode within the modems themselves, for example by a method according to one embodiment of the present invention in a software module or the like.

Embodiments of the present invention implemented under the ADSL2 standard, examples of which are shown in FIGS. 6A and 6B, again utilize a controller 610 that can seed the process of initialization, handshake, channel discovery, transceiver training, channel analysis and exchange using one or more controller-provided margin-related parameter values for the modems.

Due to the range of available PCB values (0, 1, ..., 40 dB) and the fact that either ATU-R or ATU-C can command cut back, ADSL2 has a mechanism that standardizes a wider range of power reduction, which can be used to instruct the transmitter to reduce the initial PSD if high margins have been consistently observed previously. The value of the transmitter's PCB may be calculated starting with the MAX-NOMPSD parameter that the controller provides. Embodiments of the present invention thus use past history to assist in setting the MAXNOMPSD and/or the PCB/tssi through proprietary levels lower than −60 dBm/Hz PSD's.

As note above, the transmitter can reduce by a PCB if commanded to do so by a DSM Center, operator or other controller. In ADSL2 the transmitters can impose a PCB because the modems must use the larger of the two PCBs requested by the transmitter and receiver. Typically, compliance with an operator-supplied MAXNOMPSD would have occurred and NOMPSD might already be below −40 dBm/Hz before PCB is used early in training. The actual NOMPSD value, transmitted in one of the very first messages sent between the transmitter and receiver in what is known as the G.hs portion of ADSL2 training, occurs before notification of PCB. Then, the downstream transmitter might impose a more substantial PCB for several reasons (for example, when upstream signals look so large that the transmitter wants to make sure that MAXSNRM is observed or because the transmitter has been commanded through a manufacturer-proprietary mode by the operator to use PCB). However, the external MIB for very low PSDs is not in the ADSL2 standard (MAXNOMPSD≧−60 in ADSL2).

Using the present invention, an adjustment of up to 40 dB may be necessary based on previous reported high margins of the line or line history. The transmitter can allow the controller (for example, a DSM Center) to specify that the transmitter wants a PSD lower than −60 dBm/Hz (which is strictly not required in the ADSL2 standard). 20 MAXNOMPSD cannot be lower than −60 dBm/Hz in ADSL2, so a controller (for example, a DSM Center or operator) can force additional reduction through the PCB or the tssi parameters. The tssi parameters are present in ADSL2, but cannot be specified by a controller or operator in ADSL2 (in ADSL2, only the modem manufacturer can set the tssi). (ADSL2+ does allow the tssi to be operator specified via the PSDMASK MIB parameter. In ADSL2+, a controller, operator or DSM Center can force tssi values through the MIB parameter called PSD-MASK. The PSDMASK MIB parameter does not exist in ADSL2, and the manufacturer instead can set a tssi value if they want.). To summarize, the PCB is really under control of the transmitter. The controller (for example, DSM Center or operator) can specify PCB indirectly via very low setting for transmit PSD if the ADSL2 modem allows the operator or DSM Center in a proprietary mode to set a PSD below −60 dBm/Hz. (Some ADSL1 DSLAMS have a software upgrade that goes beyond the standard G.992.1 and allows the MAX-NOMPSD value to be set by a controller/DSM Center as low as −80 dBm/Hz. In effect the line just looks longer to the ATU-R that does not know this was done, but still works fine. Otherwise, the PCB can be set instead in standard-compliant manner with tssi in ADSL2+ via the PSDMASK that is specified in ADSL2+ MIB).

In the upstream direction only, the PCB sent by the receiver (ATU-C) to the transmitter can also be requested to cause the upstream received power to be less than a value known as MAXRXPWR that can be set by the operator or the controller (for example, a DSM Center) in ADSL2. Thus, by using MAXRXPWR, a controller can cause the PCB to implement via a DSM Center command or the like. However, downstream requires use of proprietary functions to force less than −60 dBm/Hz (either with PCB or tssi). The present invention includes either setting the level with tssi, or implementing a DSM-smart transmitter that bypasses the need for controller commands and internally sets the PSD level with PCB, or both.

In FIGS. 6A and 6B the ADSL2 standard allows a receiving modem to command a power reduction (PCB) by of 0, 1, 2, ... 40 dB as part of training. This additional available maximum of 40 dB is not present in ADSL1 transmission systems. The transmitter also can decide to reduce power and notify the receiver that it has done so, thus allowing either modem to specify the PCB value. Of particular importance is the fact that the ATU-R can do this for downstream transmission and the ATU-C for upstream transmission.

In the example of FIG. 6A, the controller 610 starts by providing a margin-related parameter value (for example, a MAXNOMPSD value) to the modem pair (for example, by sending it to a single modem such as the ATU-C 630) at step 645. ATU-C 630 and ATU-R 640 each start with NOMPSD$_i$ usually set to MAXNOMPSD as depicted in step 645 of FIG. 6A and step 670 in FIG. 6B. The ADSL2 and "'G.ploam (G.997.1)" standards also allow power to be externally limited by an operator or controller (such as a DSM Center), as specified by a MAXNOMATP parameter, which would have an effect similar to the MAXNOMPSD parameter. According to ADSL2, NOMPSD must be between −60 dBm/Hz and −40 dBm/Hz for each tone i for which CARMASK is 1, allowing for selective use of frequencies within the usable band(s). As with ADSL1, the NOMPSD value typically is set to MAX-NOMPSD to permit use of maximum allowable margin.

The controller 610 may consult a margin performance history 620 (such as a library, database, memory or computer module), which can obtain its information from any appropriate source, for example a system estimation or the MIB 625, which in turn obtains its data from the ATU-C 630, one or more management entities 644 or from any other source, as will be appreciated by those skilled in the art. Using collected operational data and possibly one or more modem operational parameters, the controller 610 can analyze the operational data and then generate one or more margin-related parameter values and send the modified margin-related parameter value(s) to the modem pair for implementation. The margin-related parameter (here, for example, the MAXNOMPSD value sent to the ATU-C 630) is chosen and calculated to result in an appropriate margin level after any pre-operation transceiver training, etc. to assist the modem in meeting one or more margin targets.

The ATU-C 630 sends the staffing NOMPSD value to the ATU-R 640 during the handshake phase of the training, per § 8.13.2 of the ADSL2 standard. During the channel discovery phase (e.g. step 650 of FIG. 6A and step 675 of FIG. 6B) of the pre-operation training, the ATU-C 630 and ATU-R 640 each measure line performance and propose a PCB value. The largest PCB value (that is, the greatest decrease in power) is adopted by the modem pair 630, 640, thus establishing REFPSD for each frequency in use, where REFPSD=NOMPSD−PCB, and meaning that the lowest of the two REFPSD values suggested by the two modems (transmitter and receiver) is used. In ADSL2, the NOMPSD level may be set by the operator or the controller 610 (such as a DSM Center) to any level between −60 dBm/Hz and −38 dBm/Hz in 0.1 dB increments. Thus, a REFPSD level as low as −100 dBm/Hz could arise if the ADSL2 receiver is correctly observing MAXSNR and commands a necessarily large value of PCB. This of course presumes that the modem manufacturer has correctly implemented the PCB for MAXSNRM, but this parameter is often not implemented correctly nor directly tested and measured in present modem interoperability/compliance tests.

During transceiver training (step 655 of FIG. 6A and step 680 of FIG. 6B) and channel analysis (step 660 of FIG. 6A and step 685 of FIG. 6B), the system sets its equalizers and echo cancellers and measures the SNR in each of the downstream and upstream directions. The final stage before SHOWTIME is the exchange at step 665 of FIG. 6A and step 690 of FIG. 6B. During this final pre-operation phase, the ATU-R may command a further power adjustment in the range of −14.5 dB and +2.5+EXTGI. Thereafter, the system goes into its normal SHOWTIME operation, during which MAXSNRM is observed and complied with and during which further adjustments may be made using permitted gain swapping.

In ADSL2, the same steady-state permitted gain values of −14.5 dB to +2.5 dB found in ADSL1 are nominally used. However, in ADSL2 the reinterpretation of any synchronization symbol power level to be at the same level as data symbols allows this full −14.5 dB to +2.5 dB range of gains to be effected, whereas ADSL1 modems typically are limited to within +2.5 dB or −2.5 dB of the initial power level of −40, −42, . . . or −52 offset from the initial training gains $g_i$ level during swapping. The ADSL2 EXTGI parameter allows the gains to be increased above 2.5 dB by up to +18.0 dB in addition to the levels nominally used in ADSL2 swapping. EXTGI is determined and/or set by the DSLAM manufacturer outside the influence of any operator, controller and/or dynamic spectrum manager and is communicated to the receiving modem during initialization. A high value of EXTGI can confuse various PSD levels, since neither the MAXNOMPSD nor the PSDMASK (ADSL2+) should be exceeded even when this EXTGI is sufficiently large. Some manufacturers may ignore the mask and implement the mask-ignoring EXTGI because of the confused intentions specified by a large EXTGI value and lowered masks (although the ADSL2 standard does not permit this).

Some current modems and/or systems regularly fail to use correct settings and the MAXSNRM limit often may not be implemented correctly in ADSL2 modems. Thus, by providing a controller-defined MAXNOMPSD, the transmitter ATU-C side can impose a PCB (and/or tssi, in ADSL2) value during an initialization message conveying the downstream PCB value, effectively forcing the margin to be reduced by an amount equal to the proposed downstream PCB (and based on past history of margin observation). In particular, in one or more embodiments of the present invention, the controller 610 can supply a MAXNOMPSD level to the ATU-C 630 that is intentionally below −60 dBm/Hz to force lower margins and get them closer to the commanded MAXSNRM or to observe the commanded MAXSNRM (perhaps based on a history of margin activity that a single training of the line would not reveal to the receiver modem's PCB-determining algorithm).

In addition, when the PCB values are exchanged, the exact level of power reduction necessary to meet MAXSNRM may not be known, meaning that the PCB values can then be too conservative. Thus, again in ADSL2, the controller 610 might need to observe and/or consult the margin history 620 and impose a lower PSD on the line than the MAXNOMPSD of −52 dBm/Hz for ADSL1 or −60 dBm/Hz for ADSL2. This would then be observed by the modems through the PCB to the REFPSD=NOMPSD−PCB<MAXNOMPSD used. Furthermore, ADSL2 and the complimentary G.997.1 standard allow a DSL system operator or controller to impose a MAXNOMPSD parameter that limits the REFPSD level to as low as −60 dBm/Hz or as high as −38 dBm/Hz (depending on the applicable annex, some of which may only allow −40 dBm/Hz).

In some cases, the MAXNOMPSD (effectively the NOMPSD) may be set as high as −34 dBm/Hz (which is not standards compliant). The controller can instruct a DSLAM to go up in these cases on very long lines where the current −40 dBm/Hz would have caused only 12 or 13 dBm or so of transmit power to be used (the long lines with low margins and low data rates are the only ones that really need full power). The actual PSD lower than this −60 dBm/Hz needs to be specified through a PSDMASK parameter that is only observed as an MB-control parameter in ADSL2+. However, the controller may notify a collaborating ATU-C or ATU-R to alert that entity to use a PCB (or tssi) value that further reduces the −60 dBm/Hz even in ADSL2 in a standard-compliant manner. The MAXNOMPSD parameter is conveyed to both sides of the DSL line before ADSL training initiates in a procedure known as "handshake" (per ITU standard G.994.1). The PSDMASK parameter is only ME3 specified in ADSL2 (it is conveyed in ADSL2, but at the transmitter's discretion and not controlled or specified by the operator), but can be conveyed in other ways (for instance through file transfer programs ("ftp") or simple email messages over the internet to an agreed IP address between the controller and the ATU-C or ATU-R).

Those skilled in the art will note that the ADSL2+ standard has all of the ADSL2 capabilities specified above for up to double the spectrum or double the number of transmitted DMT tones used. Thus, power-reduction comments and capabilities discussed in connection with ADSL2 systems apply to ADSL2+ systems as well. In addition, some embodiments of the present invention pertaining to ADSL2+ use a concept known as a spectrum toolbox that allows an operator and/or controller to impose a potentially non-flat initial PSDMASK quantity that specifies multiple flat spectrum regions with a series of break frequencies and power levels. The PSDMASK may be as low as −96 dBm/Hz and as high as −32 dBm/Hz. This capability has sometimes been ignored, misunderstood or undone by transmission systems, to the detriment of such systems. Using past history of a line, a controller may use some of the ADSL2+ capabilities to implement embodiments of the present invention.

Up to 32 breakpoints (about 8 bands) are allowed in ADSL2+, but the mechanism for transfer of them in the G.994.1 initialization actually allows ADSL2+ a PSDMASK level specification for all 512 downstream and all 64 upstream tones if desired. Thus a controller such as a DSM Center or operator, by imposing a PSDMASK, can weight up or down various bands staffing with the beginning of training and continuing through all further training and SHOWTIME bit/gain-swapping. PCB can still be used, but becomes more of a receiver mechanism for implementing MAXSNRM, since the PSDMASK essentially replaces MAXNOMPSD of ADSL2 (although that parameter still exists and a PSD-MASK cannot exceed it). The equivalent of PSDMASK also is allowed upstream under G.992.5, except that it must be implemented by direct specification of the tssi parameters upstream (while downstream allows either direct specification of tssi or the easier direct specification of the PSD-MASK). The PREFBAND bit of DSM Report is in addition to G.992.5 and addresses the additional ambiguity of the PSD-MASK when observing MAXSNRM—that is, margin calculation in G.992.5 with bitcaps (which are at the limit, for example 15 bits or less, but some finite value) is typically defined as the "worst margin over all tones." Thus, the loading algorithm could increase the margin in a preferred (that is, good or used) frequency band to a very high level, while limiting margin to a smaller value in a less preferred band with lower PSD. Since the worst margin then occurs in the less preferred band, it is reported and essentially then defeats the use of MAXSNRM principle. If instead the PREFBAND is on, that means all tones' margins must be less than MAX-SNRM not just the worst. Thus, the receiver cannot confuse the intent of the PSDMASK as being used for band preference or for some other reason. The imposition of the PSDMASK is then indicated by the operator to the modems with PREF-BAND "on." The "on" indication essentially prevents vendor proprietary loading methods from defeating the intent of the preferential band treatment intended by PSDMASK imposition with PREFBAND on.

For instance, downstream, the ATU-R loading algorithm could see that the margin is 7 dB on one tone somewhere in the band and all the others are 30 dB or more. Because this is the worst margin, the modem then claims compliance with the margin target MAXSNRM. However, PSDMASK is set so that no margin on any tone will exceed MAXSNRM. PREFBAND "on" means the modem manufacturer must implement that overall compliance and cannot show 7 dB just on one tone and 30 dB everywhere else—it must observe MAXSNRM on all tones with PREFBAND "on."

Normally, low levels in PSDMASK are used to specify bands that should be avoided and/or only lightly used. However, an operator/DSM-center-specified flat low PSD-MASK<60 dBm/Hz forces the NOMPSD to this specified level (which can be as low as 96 dBm/Hz) in the invention, thus forcing via the low initial NOMPSD level a consequently also low margin (even before the modems might have used PCB to do the same). This very low PSD is invoked or forced as specified by the controller, operator or DSM Center, anticipating that some manufacturers' modems may do a poor job of margin and spectrum management, even if standards forced better management. Along with the NMS communication available, a controller may communicate the PSD-MASK as the margin-related parameter value to the modems via the Internet (email and/or ftp communication, for example). Since the PSDMASK did not come to the modems via the element management system, the modems would then need to make adjustments with PCB and/or gi (within the (−14.5 dB) to (EXTGI+2.5) limitation) to the REFPSD value.

Thus, as an example for a DSL line that allows EXTGI of 18 dB and a lowest MAXNOMPSD of −60 dBm/Hz as required in the standards: the ATU-R could adjust the PSD to −72.5 dBm/Hz in a band initialized at −58 dBm/Hz by setting the gi to −14.5 dB in that band. That same ATU-R could also in another band set a PSD of −40 dBm/Hz by setting gi=+18 dB in that other band. The resultant band preference would be then 32.5 dB (the difference between the two levels). Note that this is done without directly using the PSDMASK in the element management system MIB, but the receiver that implements loading would have been told the PSDMASK or degree of band preference over the internet and then would know to use the full gi range here to accomplish the range even though no PSDMASK initial-PSD setting was allowed. Thus an intelligent ATU-R essentially forces a standard-compliant ADSL2 ATU-C modem (where PSDMASK is not used) to implement band preference. This would use all the $g_i$ range available, so of course the tssi, if available, is a better implementation. However, tssi might not always be available as in ADSL2. On the other hand, if PSDMASK is working in the MIB of an ADSL2+ modem, then this procedure would not be needed and tssi could instead be used.

Some manufacturers allow external specification of MAX-NOMPSD down to −80 dBm/Hz in their new ADSL1 and ADSL2 software, recognizing this is a (slightly) nonstandard mode of operation but one that does not truly cause any harm other than the fact that the operator must then know to adjust certain parameters like Hlog and attenuation that were computed based on −52 dBm/Hz (or −60 dBm/Hz).

There is a reference noise upstream PSD in VDSL (referred to herein as REFNOISE) that can be used to force PSDs to certain settings. In some embodiments of the present invention, the controller works backwards from an initial REFNOISE value to an implied PSDMASK as the modified margin-related parameter value. Thus, with some translations and unconventional use of the ref-noise PSD, the present invention can be used in connection with VDSL system, and can capture the same effects as in the ADSLs.

"Band preference" is important to achieve gains in OSM and can be defined as emphasis of a band in uncoordinated loading that continues the usual bit-swapping and gain-swapping procedures that are necessary in practical systems without loss in performance. A dynamic spectrum manager cannot be expected to react and change bit distributions fast enough and certainly would be slower than the modems' reactions themselves, which is one of the reasons that OSM proponents agree that water-filling or approximations done by modems in distributed fashion (sometimes referred to as "iterative water-filling") are good enough. Band preference essentially tells the receiving modem to observe a PSDMASK within a band specified as the margin-related parameter value by the PSD-MASK or by the "tss" parameter of ADSL2+ G.992.5's "spectral toolbox" to "load with preference," allowing a priority to some bands in water-filling in general and preventing loading to levels that might interfere with other DSLs.

The theoretical water-filling procedure solves the equations:

$$E_n + \frac{\Gamma}{|H_n|^2} \cdot \sigma_n^2 = \text{constant} \quad n = 1, \ldots, NSC \quad \text{Equation (1)}$$

for non-negative energies $E_n$ on each of the tones (NSC is the maximum number of tones). The gap $\Gamma$ is a constant determined by code choices and desired margins at a given bit error rate in DSLs. The channel attenuation on each frequency is specified by $|H_n|^2$ and the noise energy on each tone is specified by $\sigma_n^2$, both of which are measured (or their ratio measured directly) during training and updated during SHOWTIME operation. This procedure is viewed as running continuously in time with updates at periodic or on-channel-change intervals.

This theoretical water-filling procedure is well-known in DSL and can be approximated in a number of ways including various greedy algorithms (also called Levin-Campello procedures) for discrete integer bit restrictions where successive bits are loaded in the least energy-consumptive bit positions on all the tones until the desired max bit rate limit has been attained with no more than a maximum specified margin (often known as MAXSNRM in various DSL standards) and no less than a minimum or target margin (often known as TARSNRM or TSNRM in various DSL standards). A frequency-dependent bit-cap and a frequency-dependent TSNRM[n] to augment the existing systems are when communicated via ftp and/or email to the receiving modem that is implementing the loading algorithm. These can also be useful if FEC cannot be adaptive and the system is forced to provide a frequency-dependent protection against an intermittent/impulse noise that does not occur often, but is large when it does occur and the frequency range it hits is known.

Loading algorithms compute the number of bits b[n] for each tone and the gi "gain" ($g_n$) factor for each tone. There are many loading-algorithm variants, which are well known to those skilled in the art. The modem vendor can attempt at any specified data rate (or maximum data rate if rate adaptive) to minimize approximately the amount of power required at the given MAXSNRM. If the margin is less than MAXSNRM, but the spectrum produced and reported appears to be deviant, a controller such as a DSM Center can suggest a PSD mask to be observed in bit-swapping and loading in the invention.

One procedure for loading is provided here for use with embodiments of the present invention. Loading essentially depends on two vector quantities: a vector of incremental normalized energies, whose components are $\Delta(b)$; and a vector of channel-referenced noises or channel-normalized mean squared errors (MSEs), $v_n$. The latter quantity $v_n$ can be computed as $$v_n = \frac{MSE[n]}{|\hat{H}_n|^2} = \frac{MSE'[n]}{|W_n \cdot \hat{H}_n|^2} \qquad \text{Equation (2)}$$

where $W_n$ is the frequency domain equalizer (FEQ) coefficient on tone n if an FEQ is used. The energy to transmit one more bit on tone n when tone n is already carrying $b_n$ bits is $$\Delta E_n(b_n+1) = \Delta(b_n+1) \cdot v_n \qquad \text{Equation (3)}$$

where the function $\Delta(b)$ does not depend on tone index n, but does depend on the ADSL constellations and the target margin TSNRM. The function $\Delta(b)$ defines the incremental (additional) energy required to transmit the $b^{th}$ bit on any channel with $v_n=1$ with respect to the $(b-1)^{th}$ bit. Thus, by storing this function $\Delta(b)$ which requires up to BCAP locations (never more than 15 bits in ADSL, so $\Delta(16)=\infty$ and $\Delta(0)=0$), and by computing/updating and storing the NSC channel-dependent quantities $v_n$ n=1, . . . , NSC, the extra energy to transmit the additional energy on any channel can be computed through the product of the two functions as in Equation (3).

After computing Equation (3), the resultant total energy on the tone needs to be compared with any applicable MAX-NOMPSD or PSDMASK constraints, and if this bound is exceeded by more than 2.5 dB (or some other precision-based number with which the designer is comfortable less than 2.5 dB), then $\Delta E_n(b_n+1)=\infty$ (that is, the incremental energy is reset to some maximum number that can be represented in the processor implementing loading). Such PSDMASK constraints may be often imposed in ADSL systems. Storing of such masks typically requires another 1 (just MAX-NOMPSD) to roughly 20 locations (PSDMASK levels for various tones in ADSL2+). Table 1 of FIG. 9 lists the incremental energies $\Delta(b)$ and the total energies for the case of no PSDMASK reached and again $v_n=1$ when no trellis codes are used for the constellations of G.992.1/3/5 ADSL (ADSL1 does not allow b=1 so the value of $\Delta(2)$ is the first of interest on any tone n in ADSL1). The quantity $\epsilon$ is a normalized reference energy that is computed as $$\epsilon = 10^{0.95 + TSNRM - CODGAIN} \qquad \text{Equation (4)}$$

where CODGAIN is $$3.8 + 3 \cdot \left(\frac{R}{N}\right) \cdot b_{ave}$$

dB for use of only FEC and represents about 3.8 dB nominally for coding gain plus the extra 6% of parity bits (so loading is referenced with respect to a system that has total data rate as reference and this reference is treated as if it had no parity nor code).

The $b_{ave}$ is the average (estimated) number of bits per tone that can be computed from an estimate of the total line rate by dividing the total number of bits per symbol (BMAX) by the number of tones, and then multiplying this by the overhead percentage and then the nominal 3 dB/bit cost. Usually this CODGAIN is about 5 dB. This extra gain above 3.8 dB is needed because a line-bit-rate is being loaded by the algorithm described here. The parity-overhead quantity (R/N) $\leq 0.08$ for this rule to work. The rule becomes optimistic if more parity is being used and the CODGAIN should not exceed 5 dB in line-bit-rate loading. The limit of 5 dB may reduce the computed line-bit-rate-bit-total BMAX (that is, the real coding gain might be yet higher than 8 dB but not as high as the formula indicates), but if a large parity fraction is being used, the line is dominated by impulse or intermittent noise and a pessimistic coding gain is prudent.

When chronic lines use larger fractions of parity, the CODGAIN is usually higher but stationary noise does not dominate performance, and thus underestimating the coding gain is not a serious error on chronic lines.

In ADSL1, the tones are reordered for encoder progression from tones with the lowest number of bits to the highest number of bits. ADSL2 instead allows the receiver to reorder the tones for transmitter encoder progression according to the receiver's desired and specified tone reordering. This tone reordering is communicated to the transmitter during training. In ADSL2 and ADSL2+, that reordering may be used to simplify loading search algorithms, but embodiments of the present invention assume it has been implemented in the relevant standardized manner and does not address the exact transmitter/receiver ordering used. The reference loading algorithm provided here is for whatever ordering was specified.

Follows is a reference training loading algorithm example:

Add each bit successively to the tone that has minimum $\Delta E_n(b_n+1)$ over all tones until one of two stopping criteria is met:

(1) the maximum net rate has been achieved; or
(2) the total energy allowed has been exceeded.

If criterion (1) has been met, then all tones can be increased in energy by up to the ratio of the PSDMASK (or MAXNOMPSD) that is applicable at each frequency. The smallest such increase in dB plus the TSNRM is the actual reported SNRM. If that smallest such increase is such that TSNRM plus the increase exceeds MAXSNRM, then all tones should instead have their energy increased by MAXSNRM−TSNRM dB.

Follows is a reference SHOWTIME loading algorithm example:

At the current data rate, search for the tone that has minimum $\Delta E_n(b_n+1)$ over all tones and store the tone index n. Search again for the tone that has maximum $\Delta E_m(b_m)$ and save the index m. Swap a bit from tone m to tone n if and only if $\Delta E_n(b_n+1) \leq \Delta E_m(b_m)$.

The total energy can be maintained if the margin does not exceed MAXSNRM for the new bit distribution. If MAXSNRM has now been exceeded on this tone and this is the tone with minimum margin, then the energy on all tones should be reduced by the factor by which tone n's margin exceeds MAXSNRM. The ADSL1 and ADSL2 standards have a "bit-swapping" mechanism for allowing a bit to move from tone m to tone n.

At the end of either procedure, the total energy on any tone is computed by $$E_n = \sum_{i=1}^{b_n} \Delta E_n(i) = E_n(b_n - 1) + \Delta E_n(b_n) \qquad \text{Equation (5)}$$

This energy level can be converted into a gain level $g_n$, as will be appreciated by those skilled in the art.

Trellis coding imposes slightly more complexity on loading but follows the same basic principle. Loading for the DMT transmission system with trellis coding forms subchannel groups of two tones each. The two tones within a group are successive tones in whatever ordering has been used. There is always an even number of used tones, and thus an integer number of groups, when trellis coding is used in ADSL. The incremental energy tables then become the incremental energy for adding a bit with trellis coding to a group (instead of just to a tone) of two tones. Up to 29 bits may be loaded in a group (15 bits for first tone plus 15 bits for 2nd tone minus one extra bit needed in trellis coding) when the BCAP=15 for all tones.

Within a group of two tones, it can be assumed without loss of generality that $v_{n+1} > v_n$ (otherwise just re-index within the loading algorithm for calculations and undo re-index when exiting the loading algorithm). The incremental energy to add a bit to a group is then always the smallest energy for adding that bit within the two tones, knowing that when starting in a group with 0 bits, the first information bit added is actually two bits (one extra first bit for the overhead of one bit/group in trellis coding) added on tone n. Every subsequent added bit costs just one incremental energy unit instead of the two incremental energy units for the first bit. The loading tables are those shown in Table 2 of FIG. 9.

Thus the loading algorithm in investigating the group of tones (n n+1) will for each bit after the first added on tone n, potentially add the bit to the individual tone with $$\Delta E_{group,n}(b_{group,n}+1) = \min_{n,n+1}(v_n \cdot \Delta(b_n+1), v_{n+1} \cdot \Delta(b_{n+1}+1)) \qquad 6$$

For deleting a bit, the 4D trellis loading algorithm investigates instead $$\Delta E_{group,n}(b_{group,n}) = \max_{n,n+1}(v_n \cdot \Delta(b_n), v_{n+1} \cdot \Delta(b_{n+1})) \qquad \text{Equation (7)}$$

If only trellis coding is used, then the CODGAIN in Equation (4) should be 4.2+1.5=5.7 dB. If both trellis and FEC are used, then the CODGAIN should be $$5.5 + 1.5 + 3 \cdot \left(\frac{R}{N}\right) \cdot b_{ave},$$

which can be estimated to be about 8 dB. Again, (R/N)≤0.08 for this rule to work. The rule becomes optimistic if more parity is being used and the CODGAIN should not exceed 8 dB in line-bit-rate loading. The limit of 8 dB may reduce the computed line-bit-rate-bit-total BMAX, but if large parity fraction is being used, the line is dominated by impulse or intermittent noise and a pessimistic coding gain is prudent.

The implementation of the loading algorithm can lead to a "ragged" or saw-tooth like energy characteristic because of the "jumps" in energy for having only integer numbers of bits per tone. Thus, one reason for adjusting gain is to "equalize" the margin on all tones. Usually this is a small effect but can provide slightly higher modem/line margin—it need not be implemented and often is not implemented by modem manufacturers. After a bit distribution is set, some tones may have slightly higher margin than others (the reported margin is the worst over all tones). In fact the tone to which a next bit would have been added had there been one more bit to load has the highest margin, the next on a different tone after that, the next highest margin, and so on. Gains on these tones with margins higher than the last tone to receive a bit in loading could all transmit slightly lower energy and the tone with the last loaded bit more (as long as PSD mask not violated).

ADSL1 and ADSL2 both allow the gain to be specified within the range of [−14.5, +2.5+EXTGI] dB during training (where EXTGI=0 always for ADSL1). ADSL2 allows this same range during SHOWTIME operation and the exact $g_n$ value is sent through the overhead channel. ADSL1 restricts the range during SHOWTIME to −2, −1, 1, 2, or 3 dB changes relative to the value last established during training or on a previous gain swap, specifically the exact precision value of the gain after a gain swap of $$\frac{1}{512} \cdot \text{round}(512 \cdot g_n \cdot 10^{value/20})$$

where round means set to the closest integer value. Cascaded gain swaps should not cause the range [−14.5, +2.5+EXTGI] to be violated.

Modem vendors should know that ADSL1 modems have a synch symbol that is not reduced in power every 17 ms. Thus, if the rest of the signal is reduced in power by any loading procedure (such as, in particular, gain swapping), then intersymbol interference (ISI) from the ADSL1 synch symbol can appear relatively large and dominate all other noises. This ISI can be cancelled in many ways, including, since the synch symbol is known, effectively reconstructing the ISI and removing it. Another solution is changing the time domain equalization settings as the gap between synch symbol energy and normal symbol energy increases. The ADSL1 standard recommends but does not mandate that SHOWTIME gain swaps maintain all symbol energy with +/−2.5 dB of the fixed synch symbol power spectral density levels.

For ADSL1, the basic loading step can be followed by a margin-equalizing step. This margin-equalizing step occurs after a data rate has been set (either attaining the desired rate in fixed-rate ADSL or settling on a maximum rate in rate-adaptive ADSL).

The algorithm referenced here can be used for ADSL1 margin-equalization during SHOWTIME (ADSL1 gain swapping) and assumes for SHOWTIME gain swapping that gains during training have already been set such that the MAXSNRM is not exceeded (if MAXSNRM was exceeded during initial training, then gain swapping is not necessary). For fixed-rate loading, the energy used will be less than the total energy allowed (or the modem will retrain or perhaps operate at <TSNRM, in which case this procedure can and should be used, resetting TSNRM to the actual lower SNRM). Computation of the margin for each tone is well known to those skilled in the art. The steps are:

1. order the tones in terms of SNRM[n] from smallest to largest (and remember order) and store $$MAXS = \max_n SNRM[n] \leq MAXSNRM.$$

2. increase each successive tone by 1 dB up to index m where SNR[m]>MAXS as long as total energy (or PSDMASK/MAXNOMPSD) is not exceeded and then reset MAXS→min(SNRM[m]+1, MAXSNRM) dB. For those tones that would have exceeded the PSDMASK/MAXNOMPSD, remove them from further consideration.
3. Reorder the tones as in step 1 again (keep order)
4. Repeat step 2 for newly ordered tones
5. Repeat step 3
6. Repeat step 4
7. Undo all ordering and reinsert any tones that previously would have exceeded PSDMASK/MAXNOMPSD.

Any gain swaps are then implemented. By the end of this procedure, up to 3 dB will have been added to those tones that had lowest margins. The bit distribution will not have changed, but the margins may have increased by 1, 2, or 3 dB on some tones. The new smallest margin will be no less than that previous to execution of the procedure and typically 1 dB or so better.

The same procedure as the ADSL1 SHOWTIME is followed for ADSL1 margin-equalization during initialization (and ADSL2 gain swapping for training or SHOWTIME), except that the designer can use a smaller increment than 1 dB, for example 0.5 dB, so that the algorithm can run up to 5 passes (instead of 3) with each pass possibly providing another 0.5 dB on some increasingly smaller subset of tones. Again if MAXSNRM has been exceeded (ADSL1 only) or attained (ADSL1 or ADSL2), then gain swapping is not necessary.

For all swapping methods, of course, as the channel noise (MSE) changes with time, first bit-swapping can be executed and then the gain swapping again. Even if no bit-swap is necessary, a gain swap may be necessary if MSE has changed.

The above-discussed algorithms are easily modified for BCAP[n] and TSNRM[n]. For a non-uniform BCAP[n]≦15, then $\Delta(b_n)=\infty$ for $b_n>$BCAP[n], which is tested before multiplying $\Delta(b_n)$ by $v_n$ to get $\Delta E_n(b_n)$. With trellis coding, BCAP[n] will apply to information bits so that as in Table 2 of FIG. 9, the last entry corresponding to $\Delta E_n(BCAP[n])=\infty$ in the column for $v_n$ while $\Delta E_{n+1}(BCAP[n+1]+1)=\infty$ for the column for $v_{n+1}$.

For non-uniform TSNRM[n], it is simpler (less memory) to alter each $v_n$, rather than alter $\Delta(b)$, according to $$v_n \rightarrow v_n \cdot \frac{TSNRM[n]}{TSNRM} \qquad \text{Equation (8)}$$

where TSNRM is the single (uniform) margin specified (usually 6 dB). Both BCAP[n] and TSNRM[n] may be used for various improvements on specific lines.

In greedy algorithms, tones that have already been loading to a maximum bit cap have infinite (large) cost to add additional bits, thus preventing bits/tone in excess of the bit-cap. The present invention recognizes that tones for which the addition of a bit would cause the PSDMASK bound specified to be exceeded should also have infinite (large) cost in those positions, which may or may not be implemented by various manufacturers. Changes in channel and or noise are monitored and the algorithms are run continuously, allowing the DMT transmission facility to move bits so that good energy use and margin are maintained. The infinite cost associated with exceeding an imposed spectral mask is maintained in SHOWTIME operation so that bits do not reallocate to a PSDMASK-limited band even if that band would be more attractive than other bands in theoretical water-filling.

The PSDMASK's imposition of essentially an infinite cost to adding bits on a particular tone when the existing energy of that tone is already at or near the mask level is used in the band preference. Essentially, it is too costly to add a bit in an un-preferred band because of the PSDMASK constraint, thus biasing or forcing the discrete water-filling algorithm (that is, the greedy algorithm) to load that same bit in a preferred band where the PSDMASK may be higher and thus encourage loading of more bits. The PSDMASK may have thus been set well below the allowed MAXNOMPSD mask in some bands to indicate preference to the use of other bands, presumably because the controller and/or dynamic spectrum manager (again, for example, an SMC or DSM Center or Manager) has determined such band preference is valuable to the lines. A central control of the bit distribution is likely impractical because of the response speed required to change the bit distribution as needed or as appropriate for time-varying channel effects (like crosstalk changes, etc.). Band preference is instead specified at time of initialization by the controller and/or dynamic spectrum manager, presumably through a considered choice of the PSDMASK levels (or alternatively possibly through $tss_n$ levels) that are specified in ADSL2+ and currently being proposed for VDSL2.

The energy on a particular tone, $E_n$, is determined by 3 components as follows:

$$E_n = E_{0,n} \cdot g_n^2 \cdot tss_n^2 \qquad \text{Equation (9)}$$

where $E_{0,n}$ is the REFPSD level. For instance, an ADSL modem with no power back off and no use of PSDMASK would have an $E_{0,n}$ that corresponds to −40 dBm/Hz (or some other value determined in the various annexes of standards or designated by as NOMPSD by a controller according to an embodiment of the present invention) that would be known to both transmitter and receiver. The quantity $g_n^2$ specifies a receiver-computed "$g_i$" gain that is usually between −14.5 dB and +2.5 dB for ADSL standards and, in theory, could be any non-negative (linear) value. This "gain" is passed to the transmitter through a reverse control channel in DMT DSL either at the exchange of initialization or during "bit-swapping" in live operation of the modem. The $tss_n^2$ parameter is fixed for any use of the modem by the MIB and can be between 0 and 1. With theoretical water-filling, the tss is almost useless, since the gain parameter could undo any tss effect and set the energy levels to the desired water-filling levels (if gains $g_n$ were not upper bounded). Of course, a tss=0 value would prevent use of the tone and could not be inverted. In practice the upper bounding of the possible gain choices by 2.5 dB or by EXTGI allows the tss to impact the loading algorithm's limits and is thus a useful tool. In particular an upper limit of gain at +2.5 dB prevents significant inversion (if this limit were raised by EXTGI, then more inversion is possible and a value of EXTGI=18.0 dB could be, perhaps erroneously, used to reintroduce the band-preference inversion of theoretical water-filling). The unmodified water-filling procedure would restore a band by a positive value of gains when tss is low. The situation of the $E_0$+2.5 dB being the maximum in Equation (1), above, corresponds directly to an infinite (large in finite precision) cost associated with adding an additional bit to that tone in discrete loading. This nonlinearity of discrete loading is important to band preference.

In a system where PSDMASK values have been set intentionally lower in an otherwise good band, the infinite cost associated with loading more bits beyond those levels that attain the mask in that band forces the loading algorithm to instead place bits into other available transmission bands that have not yet reached the PSDMASK PSD limit, essentially then preferring or favoring those other bands. This also can be done essentially with the non-standard BCAP[n] concept (the variable bit cap with frequency). For instance, in certain ADSL CO/RT mix situations and VDSL upstream examples, theoretical water-filling is ineffective because it attempts to continue to load into the lower frequency band that looks more attractive (but then is limited by the crosstalk created into the second user on the longer line). For those same situations, if the receiver also knows the PSDMASK setting, discrete water-filling would sense the infinite cost of exceeding the PSDMASK if it had been set at the appropriately low level to avoid crosstalk into the longer line (or if bit-caps were held at a certain number of maximum bits less than the usual 15). Thus, the discrete water-filling would then begin adding bits to the second higher-frequency band on the shorter line in both examples and get the same results as OSM. Significant improvements also may be realized if the dynamic spectrum manager knows that particular lines are mutual interferers (for example, using one of the estimation methodologies of the present invention described above).

In some embodiments of the present invention, PREFBAND is a 1-bit unsigned integer for which 1 specifies that cost of loading bits above the PSDMASK is to be infinite (or effectively prohibited) and that the MAXSNRM should be applied to all tones and not just the worst-margin tone. It will be appreciated by those skilled in the art that this embodiment of the present invention also could be used effectively in VDSL2. The determination of the PSDMASK levels that are imposed is the domain of a controller, such a DSM Center. The controller may need to know the Hlog and noise power spectrum density centrally as well as the DSM report's Xlog gains to be able to centrally determine good PSDMASK levels to impose in band preference. One method for such determination that avoids the high computation and convergence problems of OSM is to attempt a few gross spectrum levels and band edge frequencies in a simulated iterative discrete water-filling of all the channels using the Hlog, Xlog, and noise power spectral densities to see which settings yield acceptable line performance improvement.

OSM algorithms, and to some lesser degree band preference, require at least knowledge of the crosstalk transfer functions between interfering lines. In an ADSL2 system or in any system (email/ftp) where the all the pertinent binder insertion losses and crosstalk insertion loss transfer functions are available to or can be computed by the controller, then a central algorithm can determine the levels to be used in band preference. These levels are then communicated to the ATU-C and/or ATU-R and implemented via the PSDMASKs and/or the band-preference bit.

Measures such as forward error correction and a bit error rate in DSL systems are intended to help DSL service to provide reliably high data rates to DSL customers. While both "reliability" (defined in some instances as fewer retrainings, reduced chance of throughput decrease due to high code violation (CV) counts, etc.) and "high data rates" are important, there has been no clear way of trading the two, and service providers often have ended up with mixtures of unreliable lines (that is, for example, frequent retraining, high CV counts) and under-achieving lines (low data rates). Operators also have found that these reliability and service/performance problems contribute to repair needs and costs (for example, truck rolls) and customer satisfaction and loyalty, including customer turnover rates. Embodiments of the present invention include methods and techniques for achieving desired data rates with minimum margin or otherwise maximizing desired data rates while maintaining one or more minimum reliability conditions. That is, using embodiments of the present invention, where the maximum data rate can be maintained (for good lines), adaptive power/margin controls can be used to optimize performance. Where the maximum data rate cannot be achieved (for poor lines), adaptive data rate controls can be implemented to provide the best data rate possible that complies with one or more performance related parameters and/or targets (for example, CV count, retrainings, etc.).

In current systems and standards, the data rate is selected by the modem during training (or sometimes also in SHOWTIME in ADSL2) when the dynamic rate adaptation is "on". This selected data rate cannot exceed the maximum rate for which the customer pays, and so is fixed at this maximum rate on good lines. For poor lines, the rate is less than the maximum and is selected for a given margin level (for example, 6 dB margin) upon training. In other words, the adaptive data rate control applies only when a line cannot achieve the max rate within the customer's service plan (for example, 1.5~3 Mbps).

When the maximum data rate can be reliably achieved with an appropriate margin, there is no need to control the data rate adaptively (the maximum rate is merely chosen), and controlling margin to avoid excessive levels (while maintaining the maximum rate) is instead the issue. In such cases, the margin target for the power back-off might need to be decided adaptively for each line such that a desired performance parameter and/or target (for example, retraining/CV criteria) can be met for the line, while minimizing the interference to other lines. For example, for a line that does not see any fluctuation of noise power, a margin target of 6 dB might be enough. But for a line that sees up to 10 dB of noise power fluctuation, a proper margin to choose might be 16 dB. Until now, however, a fixed margin target has been used at the time of training, and only the noise power at the time of training has been used as the basis for choosing power back-off (that is, the history or distribution of noise power has not been considered).

Similar problems exist for poor lines under current practices. When the maximum data rate cannot be reliably achieved with an appropriate margin, there is no need to control the power adaptively (just choose the maximum power). There, controlling data rates to avoid excessive rates (while maintaining the margin levels) is instead the issue. For examples, for a line that does not see any fluctuation of noise power, a data rate of 2.0 Mbps might be appropriate to meet the desired retraining/CV or other performance-related criteria. But for a line that frequently sees a larger noise power, a data rate of 1.6 Mbps might be appropriate instead. Until now, however, a fixed margin target has been used at the time of training, and only the noise power at the time of training has been input for choosing data rate (that is, the history or distribution of noise power has not been considered). In the following examples of embodiments of the present invention, methods and techniques taking advantage of history and/or distribution are described.

For an ADSL line of interest, various operational data can be collected periodically or aperiodically. This data may include current margin, current data rate, current maximum attainable data rate, FEC correction counts, CV counts, retrain counts, channel transfer functions and noise spectra. Moreover, using collected operational data, the probability distributions of margin, maximum attainable data rate, FEC correction counts, CV counts, retrain counts, etc. can be estimated as a function of the data rate. The channel transfer function and noise spectrum might not be immediately available to a controller if the operational data is collected only from ATU-C side of ADSL1 system, but at least some of the useful data can be estimated in such situations. Techniques for acquiring such estimations can be found in U.S. Ser. No. 10/817,128, filed Apr. 2, 2004, and incorporated by reference above.

Figure 10:
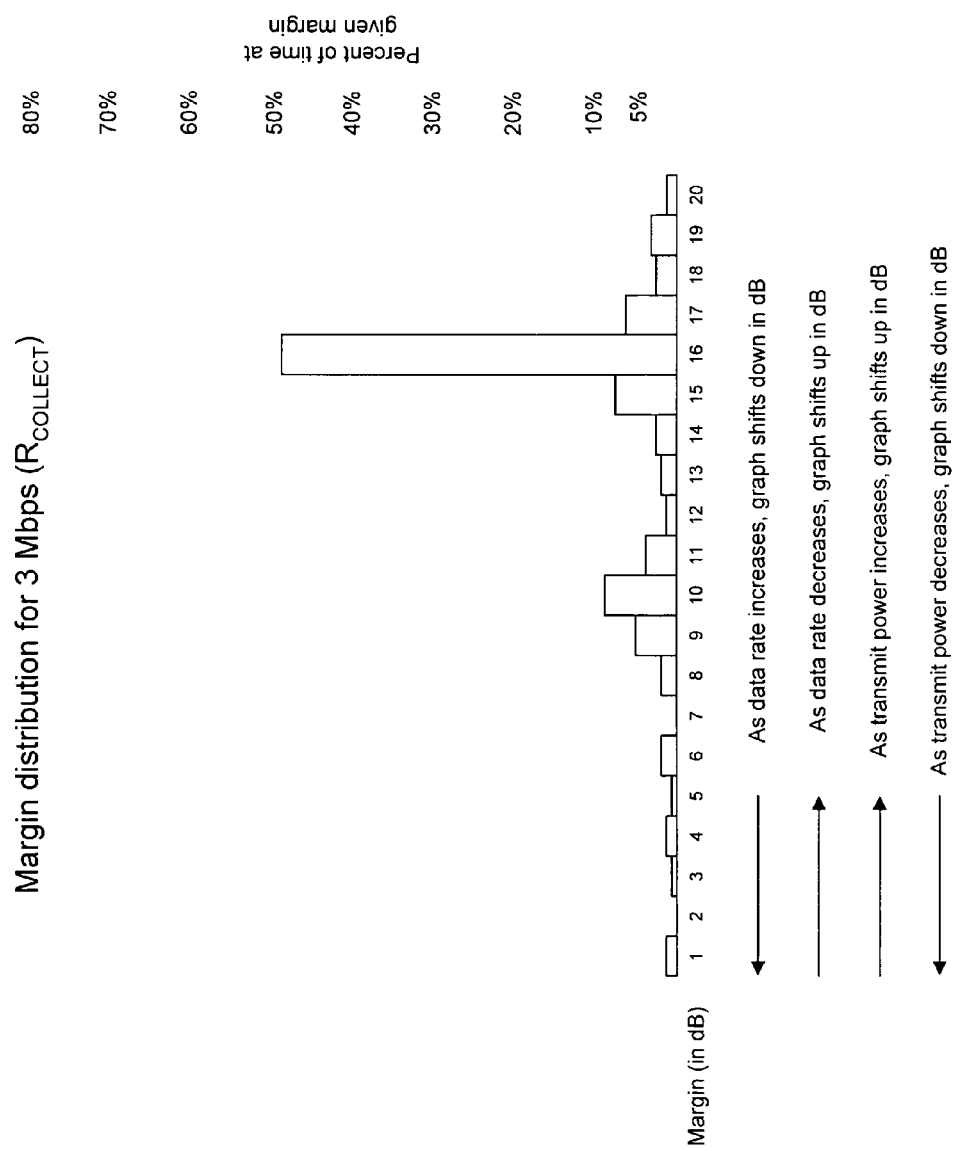
FIG. 10 is an example of a margin distribution for a given data rate estimated on the basis of collected operational data.

One example of a margin distribution plot is shown in FIG. 10. For a specific collection data rate $R_{COLLECT}$, for example 3 Mbps, operational data is collected over time to determine the percentage of time during which certain margins are used when a DSL line operates at $R_{COLLECT}$. In the example of FIG. 10, the DSL line uses a margin of 16 dB to operate at 3 Mbps approximately 50% of the time. Similarly, for the same collection data rate, the DSL line uses a margin of 10 dB approximately 10% of the time and a margin of 4 dB approximately 1-2% of the time. By adding the total percentages for given margin ranges, the likelihood of operation at or below the uppermost margin in the rate can be determined.

Margin is related closely to CV count, retraining rates, maximum data rates and other related performance parameters. For example, high CV counts and/or retraining rates may be related statistically to the number of truck rolls needed for a given DSL line. Similarly, customer satisfaction (for example, as measured by the number of customers who drop a given operator's service) may likewise be related statistically to the CV count and/or retraining rates. Therefore, after finding the distribution(s) of one or more performance parameters as a function of data rate, the probability of line outage (retraining of the line) and probability of the count of CV exceeding a threshold as a function of data rate can also then be calculated. If performance thresholds/targets are of particular importance to an operator or other party, the present invention allows that party to control data rate and/or power/margin usage adaptively to meet one or more of these targets.

The maximum power back-off (minimum margin) or maximum data rate then can be chosen while simultaneously satisfying the reliability criteria (for example, the number of retrainings and CV count exceeding a specified threshold).

For instance, multiple thresholds can be used for the number of retrainings and CV counts, and the criteria can be as follows:

Number of retrainings (per day)<1 with probability 50% or more; and

Number of retrainings (per day)<3 with probability 90% or more; and

Number of retrainings (per day)<5 with probability 99% or more; and

CV count (per 15-minute period)<2000 with probability 99% or more; and

CV count (per 15-minute period)<1000 with probability 95% or more; and

CV count (per 15-minute period)<500 with probability 90% or more.

The maximum power back-off or the highest data rate that satisfies all six criteria then is chosen.

Figure 11:
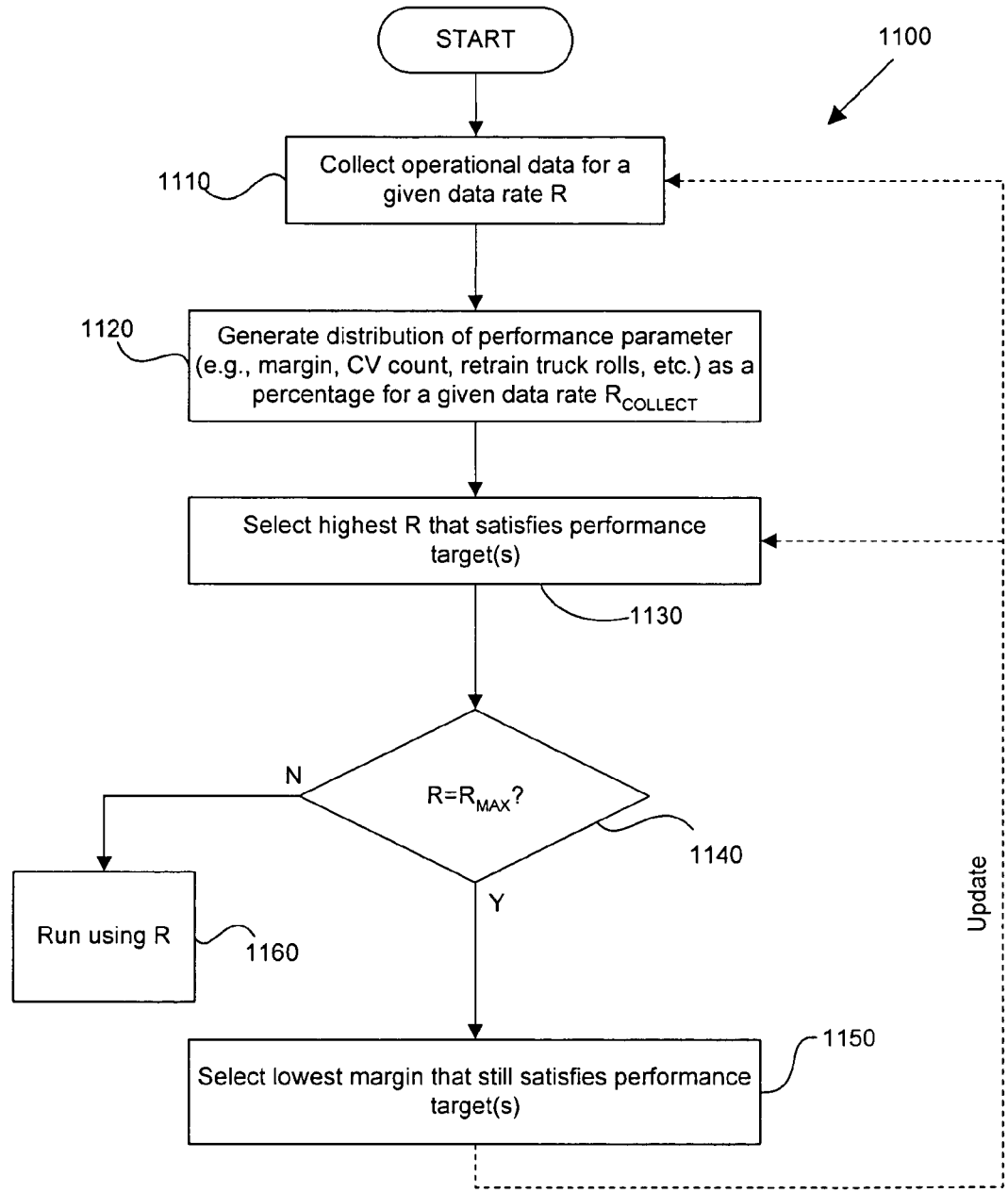
FIG. 11 is a method according to one embodiment of the present invention utilizing estimated distribution of one or more performance-related parameters such as margin.

A method 1100 according to one embodiment of the present invention is shown in FIG. 11. Initially, operational data for one or more data rates $R_{COLLECT}$ is collected at 1110. Using this collected data, at 1120 one or more distributions of a performance parameter (such as margin, as shown in FIG. 10) is plotted as a function of the given data rate used to collect the data. The highest data rate R that satisfies one or more performance targets is then selected at 1130. If at decision 1140 the highest data rate that satisfies the performance target(s) is the maximum data rate ($R_{MAX}$), then the performance parameter is optimized at 1150 to maintain that maximum rate (for example, lowering margin or increasing power back-off). If the highest rate satisfying the performance target(s) at 1130 is not $R_{MAX}$, then the DSL line operates at the selected R (step 1160), and the performance parameter follows its distribution. To ensure that reliance on one or more distributions remains valid, the system may update itself, as shown in FIG. 11.

As reflected in FIG. 10, there is a general trade-off between margin and data rate, and the margin values decrease if the data rate is increased. Using the information estimated and/or collected, a controller can, for a given margin value, find a distribution of direct performance parameters of the DSL line such as counts of forced-retrainings, CVs, code error corrections, etc. based on the same data set that is used for estimating the distributions of various performance parameters for a given data rate. Then, the retraining and CV criteria also can be translated or interpreted in terms of margin. Using the retraining and CV criteria above, for instance, the following margin criteria can be applied to the line:

margin needs to be above 3 dB for 99% of time margin needs to be above 5 dB for 95% of time margin needs to be above 6 dB for 90% of time Based on the margin distribution, the maximum power back-off or the maximum data rate can be chosen such that all three margin criteria are satisfied for the DSL line of interest. It is also possible to combine the six retraining and CV criteria with the three margin criteria such that the risk related to the estimation error can be reduced.

Embodiments of the present invention also can be applied analogously to situations in which a line experiences two distinct states with long stay periods in both states. In such cases, two sets of margin distribution criteria can be formed, and the appropriate set of criteria can be used upon the detection of the current state. Obviously, the invention can be further extended to lines with three or more states.

Generally, embodiments of the present invention employ various processes involving data stored in or transferred through one or more modems and/or computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, instruction signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers, processors, modems or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. Connection 812 may be used to communicate with the DSL system and/or modems of interest. In some cases, the computer system 800 may have a proprietary, dedicated and/or otherwise specific connection with the DSL system, perhaps through an operator's facilities (for example, a CO) or in some other suitable manner (for example, connecting to the NMS of a given DSL system). With such connections, it is contemplated that the CPU might receive information from the network and/or DSL system, or might output information to the network and/or DSL system in the course of performing the above-described method steps. The above-described devices and materials will be familiar to those of skill in the computer hardware and software arts. The hardware elements described above may define multiple software modules for performing the operations of this invention. For example, instructions for running a margin monitoring and control controller may be stored on mass storage device 808 (which may be or include a CD-ROM) and executed on CPU 802 in conjunction with primary memory 806 and a suitable computer program product in use on system 800. In a preferred embodiment, the controller is divided into software submodules.

The many features and advantages of the present invention are apparent from the written description, and the appended claims are intended to cover all such features and advantages of the invention. Further, since numerous modifications and changes will readily occur to those skilled in the art, the present invention is not limited to the exact construction and operation as illustrated and described. Therefore, the embodiments described should be taken as illustrative, not restrictive, and the invention should not be limited to the details given herein but should be defined by the following claims and their full scope of equivalents, whether foreseeable or unforeseeable now or in the future.

The invention claimed is:

1. A method in a controller communicably attached with a Digital Subscriber Line ("DSL") modem pair, comprising:
collecting operational data from the DSL modem pair, wherein the operational data comprises current operational data and historical operational data, the historical operational data collected over a period of time from prior trainings or prior DSL line uses of the DSL modem pair and stored in a library;
generating distributions over time of at least one performance-related parameter represented within the collected operational data;
analyzing the generated distributions over time of the at least one performance related parameter, wherein the analysis indicates whether the at least one performance related parameter fails to meet a target value;
generating a margin-related parameter set based on the analysis, such that when the margin-related parameter set is applied to the operation of the DSL modem pair, it reduces the likelihood of the performance-related parameter value not meeting the desired target value; and
instructing the DSL modem pair to operate in accordance with the margin-related parameter set.

2. The method of claim 1, wherein the collected operational data further comprises one or more operational parameter data types selected from the group comprising:
data rate data;
Signal-to-Noise Ratio ("SNR") margin data;
maximum attainable data rate data;
aggregate transmitted power data;
code violation count data;
forward error corrections data;
errored seconds data;
errored minutes data;
retrain counts data;
channel attenuation data;
noise power spectral density data;
crosstalk coupling data;
far-end crosstalk coupling data;
near-end crosstalk coupling data;
echo transfer function data; and
data pertaining to crosstalk between the DSL modem pair and a second DSL modem pair operating on a neighboring DSL line.

3. The method of claim 1, wherein analyzing at least one portion of the collected operational data comprises one or more actions selected from the group comprising:
comparing a current Signal-to-Noise Ratio ("SNR") margin to a maximum SNR margin;
comparing a historical SNR margin to the maximum SNR margin;
comparing the current SNR margin to a minimum SNR margin;
comparing the historical SNR margin to the minimum SNR margin;
comparing a current data rate to a maximum data rate;
comparing a historical data rate to the maximum data rate;
comparing the current data rate to a minimum data rate;
comparing the historical data rate to the maximum data rate;
comparing a current aggregate transmitted power to a maximum aggregate transmitter power;
comparing the historical aggregate transmitted power to the maximum aggregate transmitter power;
comparing a historical code violation count to a code violation threshold;
comparing a historical forward error correction count to a forward error correction threshold;
comparing a historical errored seconds count to an errored seconds threshold;
comparing a historical errored minutes count to an errored minutes threshold;
comparing a historical retrain count to a retrain threshold;
comparing a historical noise power spectral density value to a noise power spectral density threshold; and
comparing a historical crosstalk coupling value to a crosstalk coupling threshold.

4. The method of claim 3, wherein the margin-related parameter set comprises margin-related parameter values; and
wherein generating the margin-related parameter set comprises specifying at least one margin-related parameter value selected from the group comprising:
a maximum power spectral density level;
a maximum transmitted power level;
a target SNR margin;
a maximum SNR margin;
a minimum data rate;
a maximum data rate;
a start frequency of a transmission band;
an end frequency of a transmission band; and
a Preferred Band ("PREFBAND") indication to require that SNR margin measured on any used tones does not exceed the maximum SNR margin.

5. The method of claim 1, wherein the margin-related parameter set comprises at least one margin-related parameter selected from the group comprising:
a Maximum Nominal Power Spectral Density ("MAXNOMPSD");
a Maximum Nominal Aggregate Transmitted Power ("MAXNOMATP");
a Gain ("gi");
a Bit-loading ("bi");
a Power-Cut-Back ("PCB");
a Maximum Received Power ("MAXRXPWR");
a Power Spectral Density Mask ("PSDMASK");
a Preferred Band ("PREFBAND");
a Target Signal-to-Noise Ratio Margin ("TARSNRM");
a Minimum Signal-to-Noise Ratio Margin ("MINSNRM");
a Maximum Signal-to-Noise Ratio Margin ("MAXSNRM");
a frequency-dependent Bit-Cap ("BCAP");
a frequency-dependent Target Signal-to-Noise Ratio Margin ("TSNRM");
a Transmit Spectrum Shaping ("TSSi");
a specification of bands affected by radio frequency interference;
a Carrier Mask ("CARMASK");
a per band preference band indication;
a per tone bit cap;
a per tone TARSNRM;
a minimum data rate; and
a maximum data rate.

6. The method of claim 1, wherein
generating the distributions over time of the at least one performance-related parameter represented within the collected operational data comprises computing at least one probability based on the generated distributions.

7. The method of claim 6, wherein the performance-related parameter is selected from the group comprising:
historical Signal-to-Noise Ratio ("SNR") margin;
historical data rate;

historical maximum attainable data rate;
historical code violation counts;
historical forward error correction counts;
historical errored seconds counts;
historical errored minutes counts; and
historical retrain counts.

8. The method of claim 6, wherein generating the margin-related parameter set comprises:
   comparing the at least one computed probability to a threshold; and
   updating at least one margin-related parameter value in the margin-related parameter set based on the comparison of the at least one computed probability to the threshold.

9. The method of claim 8, wherein comparing the at least one computed probability to the threshold comprises performing at least one action selected from the group comprising:
   comparing a computed probability of margin to a margin threshold;
   comparing a computed probability of rate to a rate threshold;
   comparing a computed probability of maximum attainable rate to a maximum attainable rate threshold;
   comparing a computed probability of code violations to a code violations threshold;
   comparing a computed probability of forward error connections to exceeds a forward error connections threshold;
   comparing a computed probability of error seconds to an error seconds threshold;
   comparing a computed probability of error minutes to an error minutes threshold; and
   comparing a computed probability of retrain to a retrain threshold; wherein:
   updating the at least one margin-related parameter value in the margin-related parameter set comprises adjusting the data rate, or adjusting the maximum aggregate transmitted power, or adjusting the maximum Signal-to-Noise Ratio ("SNR") margin, or some combination thereof.

10. The method of claim 8, wherein:
    the generated distributions comprise distributions of code violation counts; wherein
    comparing the computed probability to the threshold comprises comparing the distributions of code violation counts against a corresponding target value, and wherein generating the margin-related parameter set comprises specifying a higher data rate parameter value in the margin-related parameter set when the probability of the code violation counts exceeding the threshold is less than the corresponding target value.

11. The method of claim 1, wherein instructing the DSL modem pair to operate in accordance with the margin-related parameter set comprises sending instructions to the DSL modem pair at one or more times selected from the group comprising:
    before a DSL modem pair training;
    during the DSL modem pair training;
    after a first DSL modem pair training state and before a second training state of the DSL modem pair;
    during normal DSL modem pair operation; and
    periodically during the normal DSL modem pair operation.

12. The method of claim 1, further comprising:
    collecting operational data from a second DSL modem pair communicably attached with the DSL controller;
    analyzing at least a portion of the collected operational data from the second DSL modem pair; wherein
    generating the margin-related parameter set based on the operational data analyzed comprises generating the margin-related parameter set based on the analysis of at least the portion of the operational data collected from the first DSL modem pair and based further on the analysis of at least the portion of the operational data collected from the second DSL modem pair; and
    wherein the method further comprises:
    instructing the second DSL modem pair to operate in accordance with the margin-related parameter set.

13. The method of claim 12, wherein analyzing the operational data collected from the first DSL modem pair and the second DSL modem pair comprises:
    performing an iterative water-filling simulation for the first DSL modem pair and the second DSL modem pair based on the operational data collected from the first DSL modem pair and based further on the operational data collected from the second DSL modem pair, wherein inputs for the iterative water-filling simulation comprise Hlog, Xlog and noise power spectral densities.

14. The method of claim 1, wherein analyzing the collected operational data comprises one or more actions selected from the group comprising:
    comparing a noise power spectral density to a noise power spectral density threshold; and
    comparing a crosstalk coupling to a crosstalk coupling threshold.

15. The method of claim 1, wherein:
    the collected operational data comprises historical Signal-to-Noise Ratio ("SNR") margin data; wherein
    analyzing the collected operational data comprises comparing the historical SNR margin data to a maximum SNR margin; and wherein
    generating the margin-related parameter set comprises specifying an increased power cutback ("PCB") parameter value in the margin-related parameter set when the historical SNR margin data exceeds the maximum SNR margin.

16. The method of claim 1, wherein the controller is an independent entity to monitor the DSL modem pair, wherein the independent entity is a component of at least one of the following:
    a remote DSL system separately located from the DSL modem pair to be monitored,
    a Network Management System ("NMS") to collect and store the operational data for subsequent analysis,
    a processing unit directly attached to one or both modems of the DSL modem pair, wherein the processing unit is to carry out operations of the controller,
    a DSL Optimizer separately located from equipment of the DSL modem pair and communicably attached with the DSL modem pair, wherein the DSL optimizer to optimize performance characteristics of the DSL modem pair,
    a Dynamic Spectrum Management ("DSM") Center to operate in a location remote from the DSL modem pair, and
    a smart modem collocated with the one or both modems of the DSL modem pair, wherein equipment of the smart modem is connected directly to each of the one or both modems of the DSL modem pair.

17. A controller to monitor a plurality of Digital Subscriber Line ("DSL") modem pairs, wherein the controller comprises:
    a collection module to collect operational data from at least one DSL modem pair, wherein the operational data comprises current operational data and historical operational data, the historical operational data collected over a period of time from prior trainings or prior DSL line uses among the plurality of DSL modem pairs;

an analysis module coupled with the collection module to generate distributions over time of the at least one performance-related parameter represented within the collected operational data, the analysis module further comprising a computational module to analyze the generated distributions over time of at least one performance-related parameter, wherein the analysis to indicate whether the at least one performance related parameter fails to meet a target value;

an instruction signal generation module coupled with the analysis module, wherein the instruction signal generation module is to generate a margin-related parameter set based on the analysis, such that when margin-related parameter set is applied to the operation of the DSL modem pairs, it reduces the likelihood of the performance-related parameter value not meeting the desired target value; and instructing the DSL modem pairs to operate in accordance with the margin-related parameter set.

18. The controller of claim 17, wherein the collection module is to interface with at least one DSL network management component selected from the group comprising:

a DSL modem from one of the plurality of DSL modem pairs;

a Management Entity ("ME") communicably attached with the DSL modem pairs;

a Management Information Base ("MIB") communicably attached with the DSL modem pairs;

a Network Management System ("NMS") communicably attached with the DSL modem pairs;

a Broadband Network communicably interfaced with the DSL modem pairs; and a database communicably attached with the DSL modem pairs, wherein the database is to store operational data collected from the at least one DSL modem pair of the plurality of DSL modem pairs.

19. The controller of claim 17, wherein the analysis module is further coupled with:

a database to store operational data collected from one or more of the plurality of DSL modem pairs; and wherein the analysis module to analyze the portion of the operational data comprises the analysis module to analyze at least a portion of the operational data stored in the database.

20. The controller of claim 17, wherein the instruction signal generation module is further coupled with at least one DSL network management component selected from the group comprising:

a DSL modem from one of the plurality of DSL modem pairs;

a Management Entity ("ME") communicably attached with the plurality of DSL modem pairs;

a Management Information Base ("MIB") communicably attached with the DSL modem pairs;

a Network Management System ("NMS") communicably attached with the DSL modem pairs; and a Broadband Network communicably interfaced with the DSL modem pairs.

21. The controller of claim 17, wherein the instruction signal generation module is to generate an instruction signal for the plurality of DSL modem pairs, wherein each instruction signal is generated at a time selected from the group comprising:

before a training in the at least one DSL modem pair;

during the training in the at least one DSL modem pair;

after a first training state in the at least one DSL modem pair and before a second training state of the at least one DSL modem pair;

during normal operation of the at least one DSL modem pair; and periodically during normal operation of the at least one DSL modem pair.

22. The controller of claim 17, wherein the collected operational data comprises at least one operational parameter type selected from the group comprising:

data rate data;

Signal-to-Noise Ratio ("SNR") margin data;

maximum attainable data rate data;

aggregate transmitted power data;

aggregate transmitted power data;

code violation count data;

forward error corrections data;

errored seconds data;

errored minutes data;

retrain counts data; and data pertaining to crosstalk between two or more of the plurality of DSL modem pairs, wherein the two or more DSL modem pairs use two or more proximate DSL communication lines.

23. The controller of claim 17, wherein the computational module to:

compute at least one probability based on the distributions over time of the at least one performance-related parameter represented within the collected operational data; and compare the probability to a threshold.

24. The controller of claim 17, wherein the analysis module comprises a computational module to perform a comparison between the collected operational data and one or more threshold values.

25. The controller of claim 17, wherein the controller is an independent entity to monitor the plurality of DSL modem pairs, wherein the independent entity is a component of at least one of the following:

a remote DSL system separately located from the plurality of DSL modem pairs to be monitored, a Network Management System ("NMS") to collect and store the operational data for subsequent analysis, a processing unit directly attached to one or both modems of the at least one DSL modem pair, wherein the processing unit is to carry out operations of the DSL controller, a DSL Optimizer separately located from equipment of the plurality of DSL modem pairs and communicably attached with the DSL modem pairs, wherein the DSL optimizer to optimize performance characteristics of the DSL modem pairs, a Dynamic Spectrum Management ("DSM") Center to operate in a location remote from the plurality of DSL modem pairs, and a smart modem collocated with the one or both modems of each of the plurality of DSL modem pairs, wherein equipment of the smart modem is connected directly to each of the one or both modems.

* * * * *